(12) United States Patent
Winger et al.

(10) Patent No.: US 11,233,407 B2
(45) Date of Patent: Jan. 25, 2022

(54) SWITCH CONTROL SYSTEMS AND METHODS FOR BATTERY WITH ADJUSTABLE CAPACITY

(71) Applicant: GM Global Technology Operations LLC, Detroit, MI (US)

(72) Inventors: Lyall K. Winger, Waterloo (CA); Dave G. Rich, Sterling Heights, MI (US); Suresh Gopalakrishnan, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 321 days.

(21) Appl. No.: 16/290,602

(22) Filed: Mar. 1, 2019

(65) Prior Publication Data
US 2020/0280197 A1    Sep. 3, 2020

(51) Int. Cl.
*H02J 7/00* (2006.01)
*H01M 10/42* (2006.01)
*H01M 10/48* (2006.01)
*B60L 3/04* (2006.01)
*B60L 53/00* (2019.01)

(52) U.S. Cl.
CPC ............. *H02J 7/0026* (2013.01); *B60L 3/04* (2013.01); *B60L 53/00* (2019.02); *H01M 10/425* (2013.01); *H01M 10/482* (2013.01); *H02J 7/0029* (2013.01); *H01M 2010/4271* (2013.01); *H02J 7/0014* (2013.01)

(58) Field of Classification Search
CPC ..................................................... H02J 7/0029
USPC ........................................................ 320/134
See application file for complete search history.

(56) References Cited

U.S. PATENT DOCUMENTS

| | | | |
|---|---|---|---|
| 2013/0106357 A1* | 5/2013 | Girard | H02J 7/0025 320/126 |
| 2017/0331304 A1* | 11/2017 | Arendell | H02J 7/0029 |
| 2018/0248355 A1* | 8/2018 | Iwasaki | H02H 3/18 |

* cited by examiner

*Primary Examiner* — Edward Tso
*Assistant Examiner* — Ahmed H Omar

(57) ABSTRACT

A battery includes: a first terminal; a second terminal; a plurality of individually housed batteries; a plurality of switches configured to connect ones of the individually housed batteries to and from ones of the first and second terminals; and a switch control module configured to: at a frequency, vary a voltage applied to a gate of one of the switches, the one of the switches configured to connect at least one of the individually housed batteries to one of the first and second terminals; and diagnose whether a fault is present in the one of the switches based on a voltage across the one of the switches.

20 Claims, 18 Drawing Sheets

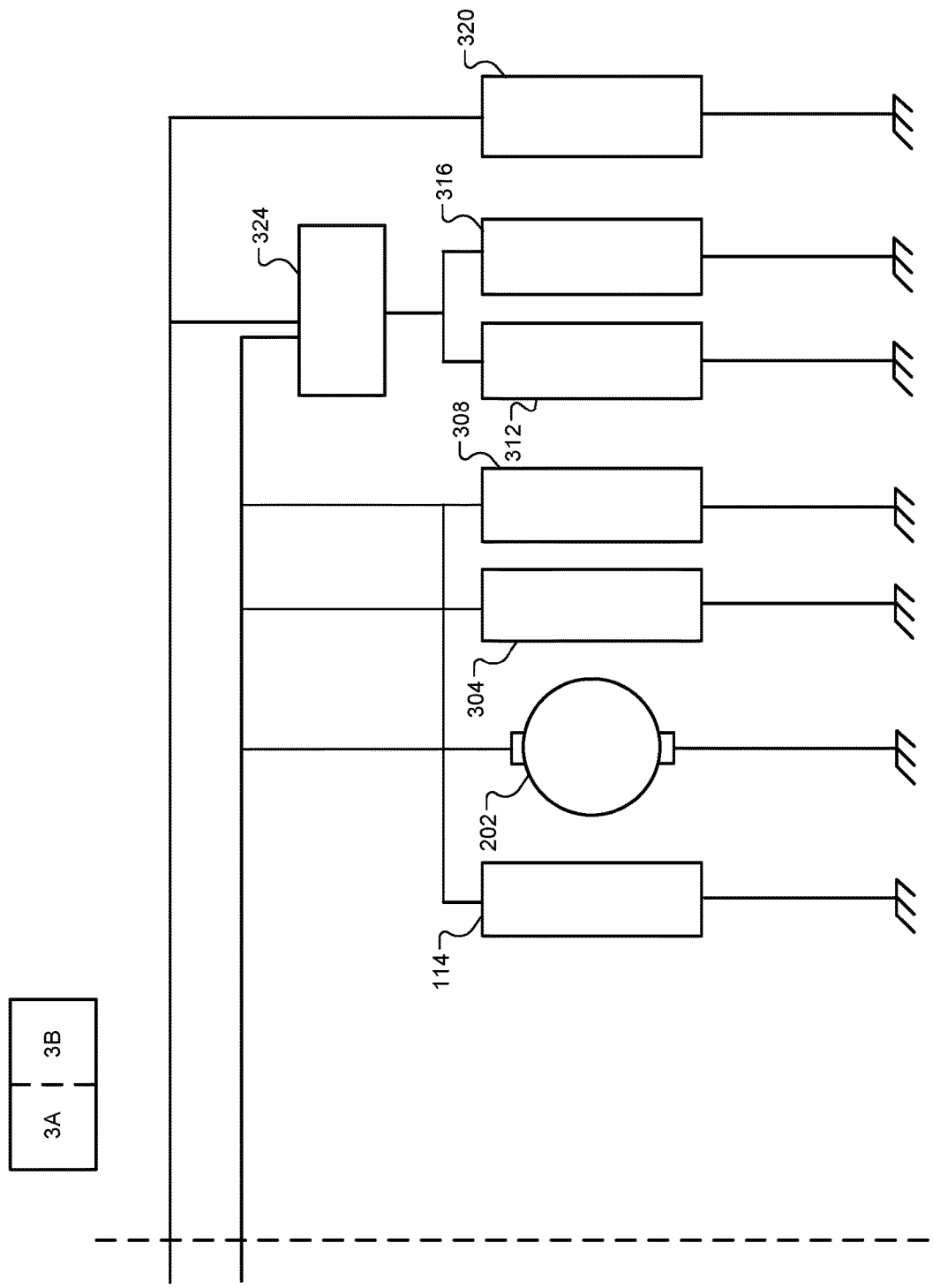

SWITCH CONTROL SYSTEMS AND METHODS FOR BATTERY WITH ADJUSTABLE CAPACITY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to battery systems of vehicles.

Some types of vehicles include only an internal combustion engine that generates propulsion torque. Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine. Electric vehicles include a battery and one or more electric motors that generate propulsion torque.

SUMMARY

In a feature, a battery includes: a first terminal; a second terminal; a plurality of individually housed batteries; a plurality of switches configured to connect ones of the individually housed batteries to and from ones of the first and second terminals; and a switch control module configured to: at a frequency, vary a voltage applied to a gate of one of the switches, the one of the switches configured to connect at least one of the individually housed batteries to one of the first and second terminals; and diagnose whether a fault is present in the one of the switches based on a voltage across the one of the switches.

In further features, the switch control module is configured to diagnose that the fault is present in the one of the switches when the voltage across the one of the switches does not vary at the frequency.

In further features, the switch control module is configured to diagnose that the fault is not present in the one of the switches when the voltage across the one of the switches varies at the frequency.

In further features, the switch control module is configured to store a predetermined diagnostic trouble code (DTC) in memory in response to diagnosing the fault in the one of the switches.

In further features, the switch control module is configured to illuminate a malfunction indicator in response to diagnosing the fault in the one of the switches.

In further features, the switch control module is further configured to: at a second frequency, vary a second voltage applied to a second gate of a second one of the switches, the second one of the switches configured to connect a second at least one of the individually housed batteries to one of the first and second terminals; and diagnose whether the fault is present in the second one of the switches based on a second voltage across the second one of the switches.

In further features, the frequency is one of: equal to the second frequency; greater than the second frequency; and less than the second frequency In further features, the frequency is a fixed predetermined frequency.

In further features, the plurality of individually housed batteries include a plurality of individually housed 12 Volt batteries.

In a feature, a battery includes: a first terminal; a second terminal; a plurality of individually housed batteries; a plurality of switches configured to connect ones of the individually housed batteries to and from ones of the first and second terminals; and a switch control module configured to, based on a current through one of the switches, selectively vary a voltage applied to a gate of the one of the switches to between (i) a first predetermined voltage corresponding to one of the switches being fully open and (ii) a second predetermined voltage corresponding to the one of the switches being fully closed, the one of the switches configured to connect at least one of the individually housed batteries to one of the first and second terminals.

In further features, the switch control module is configured to selectively vary the voltage applied to the gate of the one of the switches based on the current through the one of the switches and a second current through a second one of the switches, the second one of the switches configured to connect at least one other one of the individually housed batteries to the one of the first and second terminals.

In further features, the switch control module is further configured to selectively vary a second voltage applied to a second gate of the second one of the switches based on the current through the one of the switches and the second current through the second one of the switches.

In further features, the switch control module is configured to determine a target current based on the current and the second current and selectively vary the voltage applied to the gate of the one of the switches to adjust the current to within a predetermined value of the target current.

In further features, the switch control module is configured to increase the voltage applied to the gate when the current is less than the target current.

In further features, the switch control module is configured to decrease the voltage applied to the gate when the current is greater than the target current.

In further features, a mode module is configured to set an operating mode based on at least one operating parameter, where the switch control module is configured to set the predetermined value based on the operating mode.

In further features, the switch control module is configured to: set the predetermined value to a first predetermined value when the operating mode is in a first mode; and set the predetermined value to a second predetermined value when the operating mode is in a second mode.

In further features, the second predetermined value is greater than the first predetermined value.

In further features, the switch control module is configured to selectively vary the voltage applied to the gate of the one of the switches based on the current through the one of the switches and N other currents through N other ones of the switches, the N other ones of the switches configured to connect at least N other ones of the individually housed batteries in parallel with the one of the individually housed batteries to the one of the first and second terminals.

In a feature, a battery includes: a first terminal; a second terminal; a plurality of individually housed batteries; a plurality of switches configured to connect ones of the individually housed batteries to and from ones of the first and second terminals; and a switch control module configured to, based on a resistance of one of the switches, selectively vary a voltage applied to a gate of the one of the switches to between (i) a first predetermined voltage corresponding to one of the switches being fully open and (ii) a second predetermined voltage corresponding to the one of the switches being fully closed, the one of the switches configured to connect at least one of the individually housed batteries to one of the first and second terminals.

In further features, the switch control module is configured to selectively vary the voltage applied to the gate of the one of the switches based on the resistance of the one of the switches and a second resistance of a second one of the switches, the second one of the switches configured to connect at least one other one of the individually housed batteries to the one of the first and second terminals.

In further features, the switch control module is further configured to selectively vary a second voltage applied to a second gate of the second one of the switches based on the resistance of the one of the switches and the second resistance of the second one of the switches.

In further features, the switch control module is configured to determine a target resistance based on the resistance and the second resistance and selectively vary the voltage applied to the gate of the one of the switches to adjust the resistance to within a predetermined value of the target resistance.

In further features, the switch control module is configured to decrease the voltage applied to the gate when the resistance is less than the target resistance.

In further features, the switch control module is configured to increase the voltage applied to the gate when the resistance is greater than the target resistance.

In further features, a mode module is configured to set an operating mode based on at least one operating parameter, where the switch control module is configured to set the predetermined value based on the operating mode.

In further features, the switch control module is configured to: set the predetermined value to a first predetermined value when the operating mode is in a first mode; and set the predetermined value to a second predetermined value when the operating mode is in a second mode.

In further features, the second predetermined value is greater than the first predetermined value.

In further features, the switch control module is configured to selectively vary the voltage applied to the gate of the one of the switches based on the resistance of the one of the switches and N other resistance of N other ones of the switches, the N other ones of the switches configured to connect at least N other ones of the individually housed batteries in parallel with the one of the individually housed batteries to the one of the first and second terminals.

In a feature, a battery includes: a first terminal; a second terminal; a plurality of individually housed batteries; a plurality of switches configured to connect ones of the individually housed batteries to and from ones of the first and second terminals; and a switch control module configured to, based on temperatures of the individually housed batteries, selectively vary voltages applied to gates of the ones of the switches, the ones of the switches configured to connect ones of the individually housed batteries to one of the first and second terminals.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 3A-3B are a schematic including an example implementation of a battery;

In the drawings, reference numbers may be reused to identify similar and/or identical elements.

DETAILED DESCRIPTION

A vehicle includes a battery having first output terminals on a housing of the battery for outputting a first operating voltage (e.g., 12 V or 48 V) and second output terminals on the housing for outputting a second operating voltage (e.g., 12 V or 48 V). The battery includes a plurality of individually housed batteries and a plurality of switches. A switch control module controls the switches to connect selected ones of the individual batteries to the first and second output terminals and to provide target capacities and output voltages at the first and second output terminals. The switch control module may set the target capacities, for example, based on a mode of operation of the vehicle (e.g., cranking, auxiliary, run, etc.).

The switch control module may also approximately balance the current flow to or from each of two or more of the individually housed batteries that are connected in parallel. This balances charging and discharging of the individually housed batteries. This also reduces differences in wear of the individual batteries, equalizes aging of the individual batteries, and optimizes capacity utilization.

The switch control module may also determine a condition of each switch. The switch control module varies the gate voltage of each of the switches according to a frequency. If the voltage across a switch does not vary at the frequency, the switch control module may indicate the presence of a fault in the switch. The switch control module may indicate that the switch does not include the fault when the voltage across the switch varies at the frequency.

Figure 1:
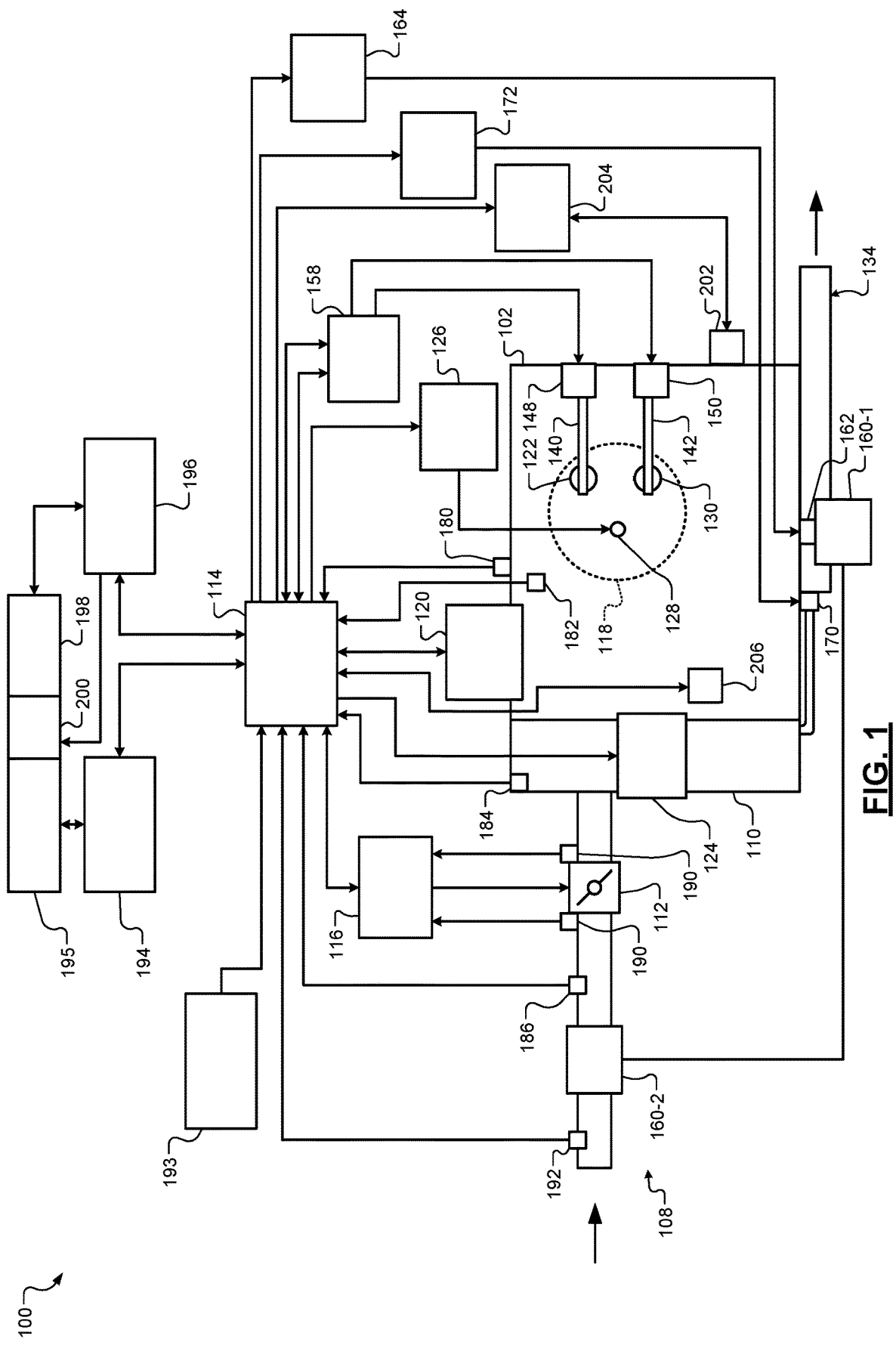
FIG. 1 is a functional block diagram of an example engine control system.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft-based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate (WG) 162 controls exhaust flow through and bypassing the turbocharger turbine 160-1. Wastegates can also be referred to as (turbocharger) turbine bypass valves.

The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198. While the example of one electric motor is provided, multiple electric motors may be implemented.

The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a battery 208 to the electric motor 198 to cause the electric motor 198 to output positive torque. The battery 208 is discussed further below. The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted.

The ECM 114 starts the engine 102 via a starter motor 202. The ECM 114 or another suitable module of the vehicle engages the starter motor 202 with the engine 102 for an engine startup event. For example only, the ECM 114 may engage the starter motor 202 with the engine 102 when a key ON command is received. A driver may input a key ON command, for example, via actuating one or more ignition keys, buttons, and/or switches of the vehicle or of a key fob of the vehicle. The starter motor 202 may engage a flywheel coupled to the crankshaft or one or more other suitable components that drive rotation of the crankshaft.

The ECM 114 may also start the engine in response to an auto-start command during an auto-stop/start event or to an engine start command for a sailing event. Auto-stop/start events include shutting down the engine 102 while the vehicle is stopped, the driver has depressed the brake pedal, and the driver has not input a key OFF command. An auto-start command may be generated while the engine 102 is shut down for an auto-stop/start event, for example, when a driver releases the brake pedal and/or depresses the accelerator pedal.

Sail events may include the ECM 114 shutting down the engine 102 when the vehicle is moving (e.g., vehicle speed greater than a predetermined speed, such as 50 miles per hour), the driver is not actuating the accelerator pedal, and the driver has not input a key OFF command. An engine start command may be generated while the engine 102 is shut down for a sail event, for example, when a driver depresses the accelerator pedal. The driver may input a key OFF command, for example, via actuating the one or more ignition keys, buttons, and/or switches, as discussed above.

A starter motor actuator, such as a solenoid, may actuate the starter motor 202 into engagement with the engine 102. For example only, the starter motor actuator may engage a starter pinion with a flywheel coupled to the crankshaft. In various implementations, the starter pinion may be coupled to the starter motor 202 via a driveshaft and a one-way clutch. A starter actuator module 204 controls the starter motor actuator and the starter motor 202 based on signals from a starter control module, as discussed further below. In various implementations, the starter motor 202 may be maintained in engagement with the engine 102.

In response to a command to start the engine 102 (e.g., an auto-start command, an engine start command for an end of a sail event, or when a key ON command is received), the starter actuator module 204 supplies current to the starter motor 202 to start the engine 102. The starter actuator module 204 may also actuate the starter motor actuator to engage the starter motor 202 with the engine 102. The starter actuator module 204 may supply current to the starter motor 202 after engaging the starter motor 202 with the engine 102, for example, to allow for teeth meshing.

The application of current to the starter motor 202 drives rotation of the starter motor 202, and the starter motor 202 drives rotation of the crankshaft (e.g., via the flywheel). The period of the starter motor 202 driving the crankshaft to start the engine 102 may be referred to as engine cranking.

The starter motor 202 draws power from the battery 208 to start the engine 102. Once the engine 102 is running after the engine startup event, the starter motor 202 disengages or is disengaged from the engine 102, and current flow to the starter motor 202 may be discontinued. The engine 102 may be considered running, for example, when an engine speed exceeds a predetermined speed, such as a predetermined idle speed. For example only, the predetermined idle speed may be approximately 700 revolutions per minute (rpm) or another suitable speed. Engine cranking may be said to be completed when the engine 102 is running.

A generator 206 converts mechanical energy of the engine 102 into alternating current (AC) power. For example, the generator 206 may be coupled to the crankshaft (e.g., via gears or a belt) and convert mechanical energy of the engine 102 into AC power by applying a load to the crankshaft. The generator 206 rectifies the AC power into DC power and stores the DC power in the battery 208. Alternatively, a rectifier that is external to the generator 206 may be implemented to convert the AC power into DC power. The generator 206 may be, for example, an alternator. In various implementations, such as in the case of a belt alternator starter (BAS), the starter motor 202 and the generator 206 may be implemented together.

Figure 2:
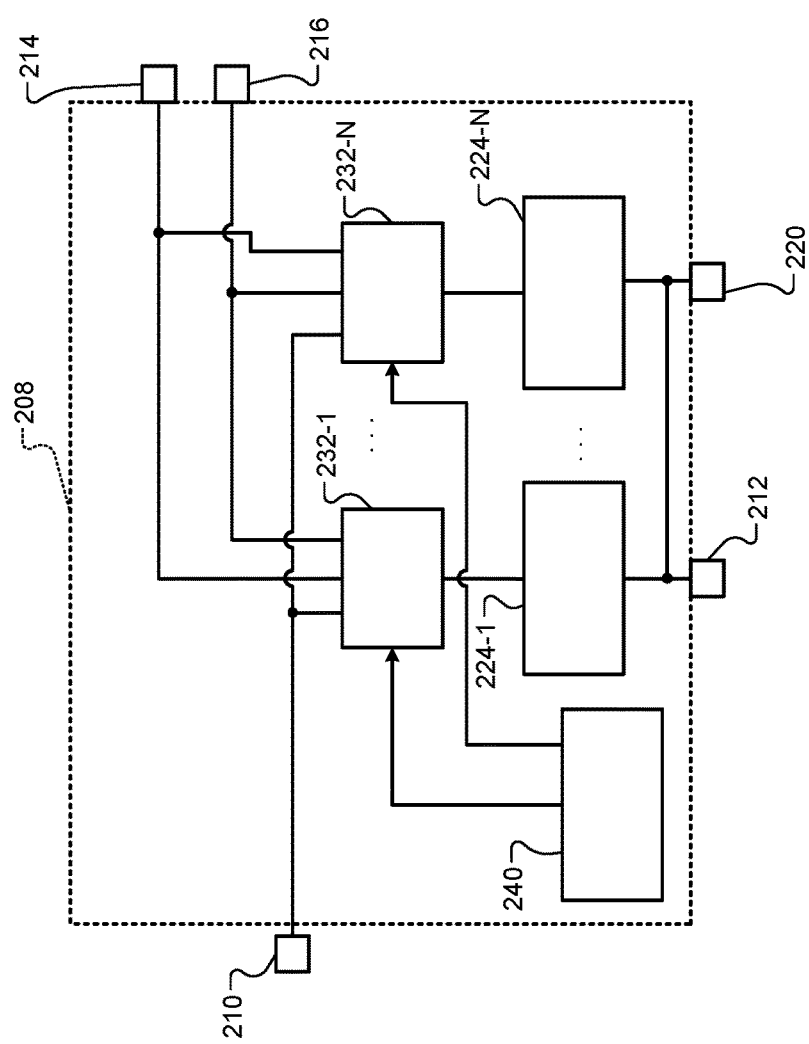
FIG. 2 is a functional block diagram an example electrical system of a vehicle.

FIG. 2 is a functional block diagram of an example electrical system of the vehicle. The electrical system includes the battery 208 discussed above.

The battery 208 has two or more different sets of output terminals to provide two or more direct current (DC) operating voltages. Each set of output terminals includes a positive terminal and a negative terminal. Two or more sets of output terminals may share a negative terminal, or the negative terminals of two or more sets may be internally connected within the battery 208 or externally connected. For example only, the battery 208 may have a first positive (e.g., 48 Volt (V)) terminal 210, a first negative terminal 212, a second positive (e.g., a first 12 V) terminal 214, a third positive (e.g., a second 12 V) terminal 216, and a second negative terminal 220. While the example of the battery 208 having a 48 V operating voltage and two 12 V operating voltages is provided, the battery 208 may have one or more other operating voltages, such as only two 12 V operating voltages, only two 48 V operating voltages, two 48 V operating voltages and a 12 V operating voltage, or a combination of two or more other suitable operating voltages. In various implementations, the second negative terminal 220 may be omitted.

The battery 208 includes a plurality of individual batteries, such as a first battery 224-1, . . . , and an N-th battery 224-N ("batteries 224"), where N is an integer greater than or equal to 2. In various implementations, N may be equal to 6, 8, 10, or 12. Each of the batteries 224 may include a group of two or more battery cells, and each of the batteries 224 may be separately replaceable within the battery 208. For example only, each of the batteries 224 may be an individually housed 12 V DC battery or a group of two or more battery cells that are electrically connected to form an individual 12 V DC block. The ability to individually replace the batteries 224 may enable the battery 208 to include a shorter warranty period and have a lower warranty cost. The batteries 224 are also individually isolatable, for example, in the event of a fault in a battery module. In various implementations, the battery 208 may have the form factor of a standard automotive grade 12 V battery.

Each of the batteries 224 has its own separate capacity (e.g., in amp hours, Ah). The battery 208 includes a plurality of switches, such as first switches 232-1, . . . , N-th switches 232-N (collectively "switches 232"). The switches 232 enable the batteries 224 to be connected in series, parallel, or combinations of series and parallel to provide desired output voltages and capacities at the output terminals.

A switch control module 240 controls the switches 232 to provide desired output voltages and capacities at the output terminals. The switch control module 240 controls the switches 232 to vary the capacity provided at the output terminals based on a present operating mode of the vehicle, as discussed further below. The switch control module 240 also controls the switches 232 to match impedances of the batteries 224 during charging and discharging to balance wear on the batteries 224. More specifically, the switch control module 240 controls the switches 232 to match current to or from the batteries 224 to balance wear on the batteries 224. The switch control module 240 may additionally or alternatively control the switches 232 to adjust current flow from one or more of the batteries 224 to adjust a temperature of one or more of the batteries 224 and/or to equalize temperature variation from battery to battery.

The switch control module 240 also varies gate voltages of the switches 232 at a frequency to verify integrity of the switches 232. The switch control module 240 may indicate that a fault is present in one of the switches 232 when a voltage across the one of the switches 232 does not vary at the frequency. The switch control module 240 may indicate that the fault is not present in the one of the switches 232 when the voltage across the one of the switches 232 varies at the frequency. In various implementations, the switch control module 240 may be implemented within the battery 208.

Figure 3A:
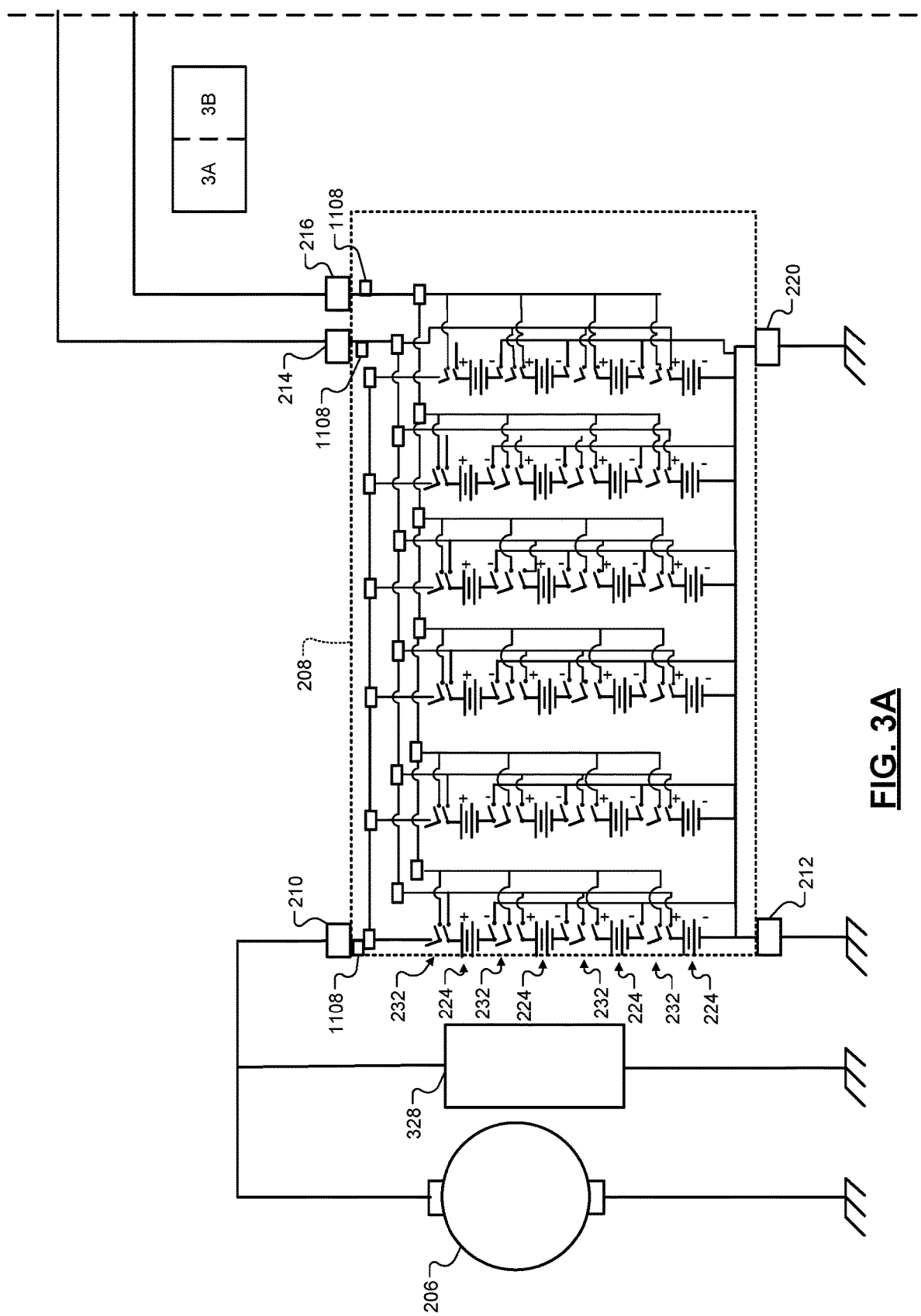

FIGS. 3A-3B are a schematic including an example implementation of the battery 208. In the example of FIG. 3A, sets of 4 of the batteries 224 (e.g., 12 V batteries) are connectable in series (via ones of the switches 232) to the first positive terminal 210 and the first negative terminal 212 to provide a first output voltage (e.g., 48 V). Individual ones of the batteries 224 can be connected (via ones of the switches 232) to the second positive terminal 214 or the third positive terminal 216 and the second negative terminal 220 to provide a second output voltage (e.g., 12 V) at the second and third positive terminals 214 and 216. How many of the batteries 224 are connected to the first positive terminal 210, the second positive terminal 214, and the third positive terminal 216 dictates the portions of the overall capacity of the battery 208 available at each of the positive terminals.

As shown in FIG. 3B, a first set of vehicle electrical components operates using one of the two or more operating voltages of the battery 208. For example, the first set of vehicle electrical components may be connected to the second and third positive terminals 214 and 216. Some of the first set of vehicle electrical components may be connected to the second positive terminal 214, and some of the first set of vehicle electrical components may be connected to the third positive terminal 216. The first set of vehicle electrical components may include, for example but not limited to, the ECM 114 and other control modules of the vehicle, the starter motor 202, and/or other electrical loads, such as first 12 V loads 304, second 12 V loads 308, other control modules 312, third 12 V loads 316, and fourth 12 V loads 320. In various implementations, a switching device 324 may be connected to both of the first and second positive terminals 214. The switching device 324 may connect the other control modules 312 and the third 12 V loads 316 to the second positive terminal 214 or the third positive terminal 216.

As shown in FIG. 3A, a second set of vehicle electrical components operates using another one of the two or more operating voltages of the battery 208. For example, the second set of vehicle electrical components may be connected to the first positive terminal 210. The second set of vehicle electrical components may include, for example but not limited to, the generator 206 and various electrical loads, such as 48 V loads 328. The generator 206 may be controlled to recharge the battery 208. In various implementations, the generator 206 may be a motor-generator unit (MGU) that can output torque based on power applied from the battery 208 and that can convert mechanical energy of the vehicle into electrical energy to recharge the battery 208.

Each of the switches 232 may be an insulated gate bipolar transistor (IGBT), a field effect transistor (FET), such as a metal oxide semiconductor FET (MOSFET), or another suitable type of switch.

Figure 3C:
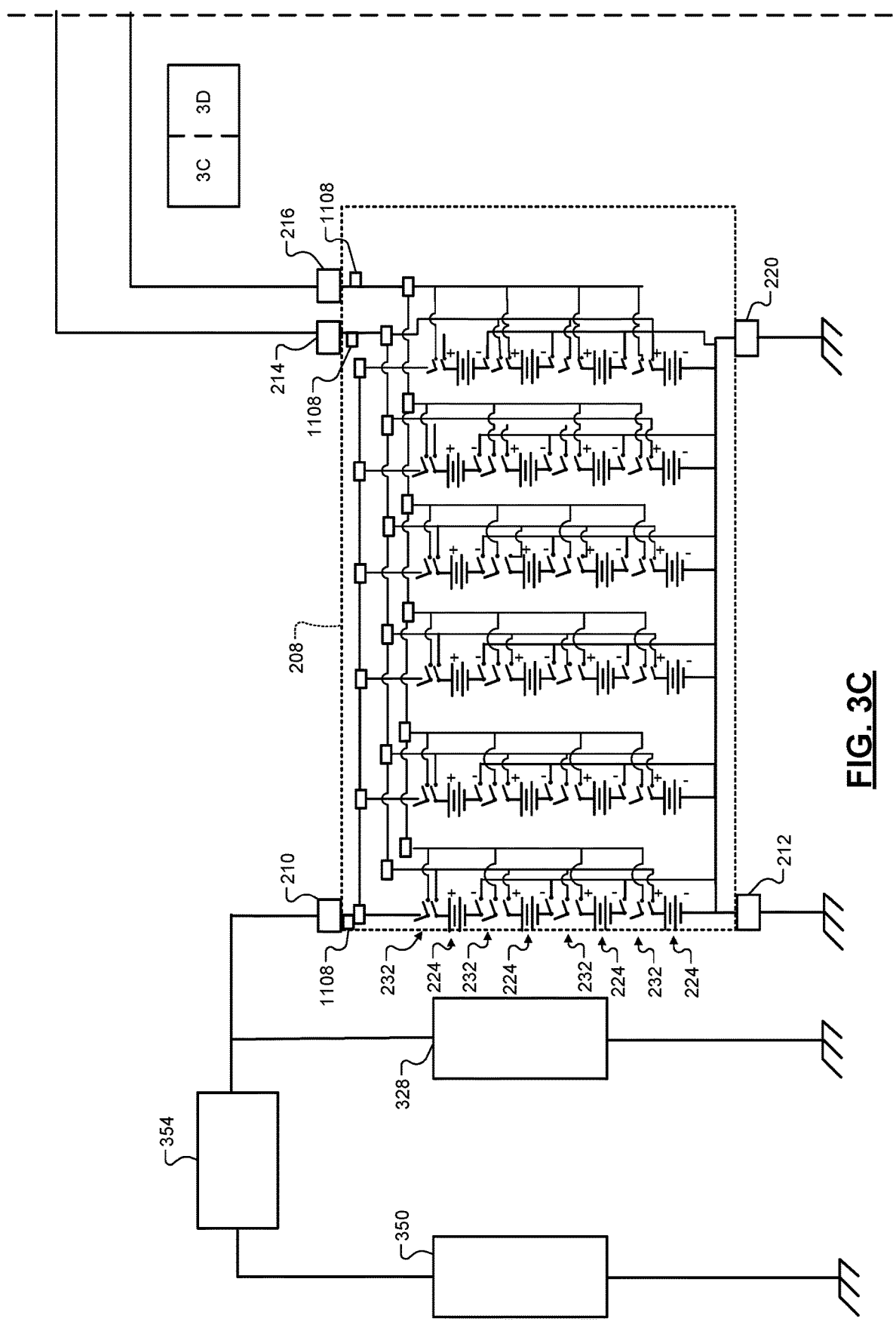
FIGS. 3C-3D are a schematic including an example implementation of the battery.
Figure 3D:
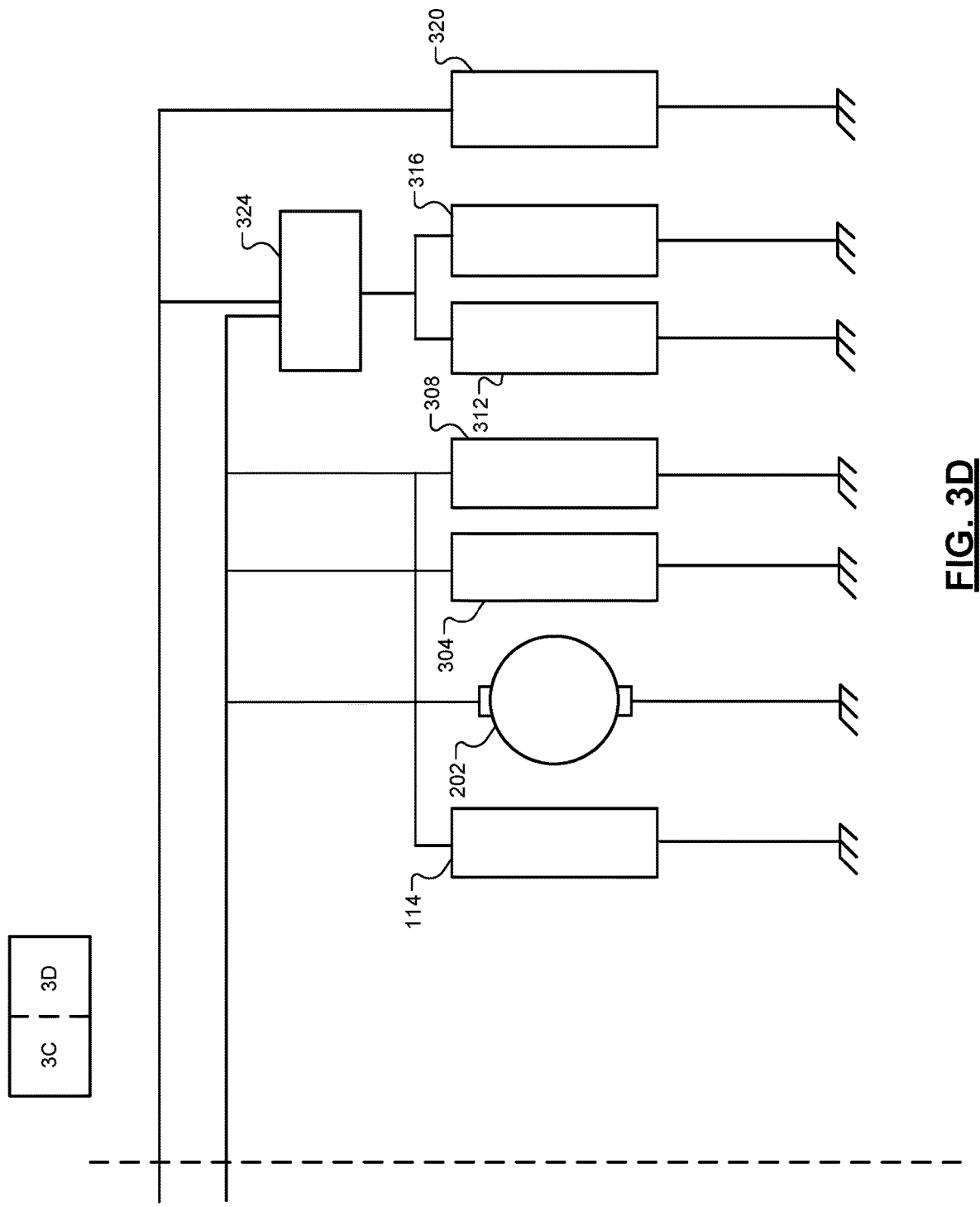

FIGS. 3C-3D are a schematic including an example implementation of the battery 208. The battery 208 may be used with a high voltage (HV) battery 350. The high voltage battery 350 has a third output voltage that is greater than the second output voltage. The third output voltage is greater than or equal to 60 V and may be 60 V-1000 V or greater. The high voltage battery 350 may provide power to one or more electric motors to drive a vehicle. An accessory power module (APM) 354 supplies power to the battery 208 from the high voltage battery 350. The APM 354 converts the voltage output of the high voltage battery 350 into one, more than one, or all of the two or more operating voltages of the battery 208.

Figure 4:
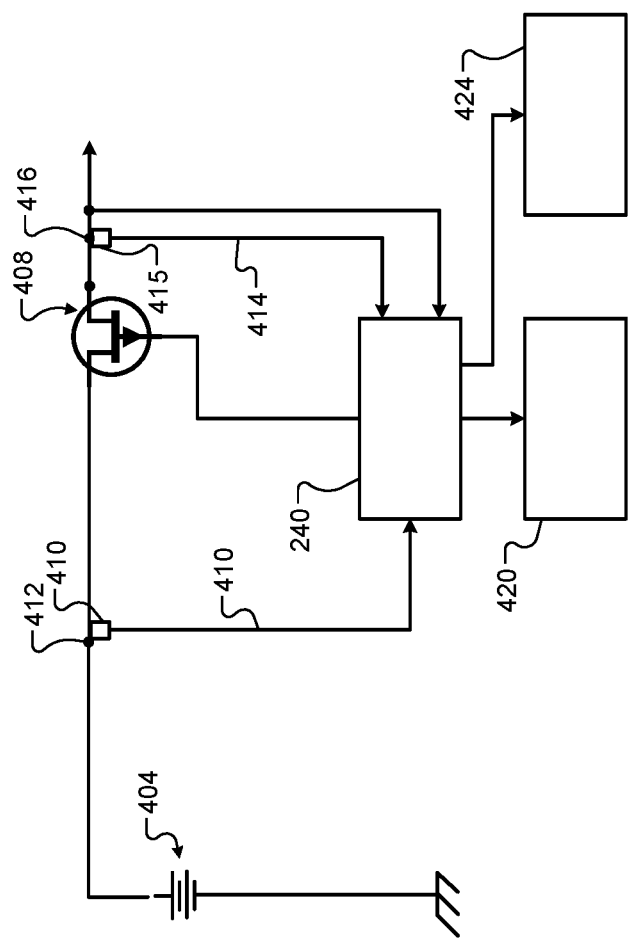
FIG. 4 includes a schematic including a switch control module, a battery, and a switch.

FIG. 4 includes a schematic including the switch control module 240, a battery 404, and a switch 408. The battery 404 is one of the batteries 224, and the switch 408 is one of the switches 232. The switch control module 240 controls the switch 408 to connect the battery 404 to one of the positive terminals and to disconnect the battery 404 from the one of the positive terminals. While the example of the switch 408 is provided, the switch control module 240 may perform as follows for one, more than one, or all of the switches 232.

The switch control module 240 varies a voltage applied to a gate of the switch 408 at a frequency. The switch control module 240 varies the voltage applied to the gate of the switch 408 by a predetermined voltage. The switch control module 240 may vary the voltage applied to the gates of other ones of the switches at the same or different frequencies and at the same or different predetermined voltages. The frequency may be a fixed, predetermined frequency or may be variable. The predetermined voltage may be positive, negative, or include both positive and negative portions. The switch control module 240 varies the voltage applied to the gate of the switch 408 at the frequency to a voltage that is between (a) a first predetermined voltage where the switch 408 is in a fully open state and (b) a second predetermined voltage where the switch 408 is in a fully closed state.

Figure 5:
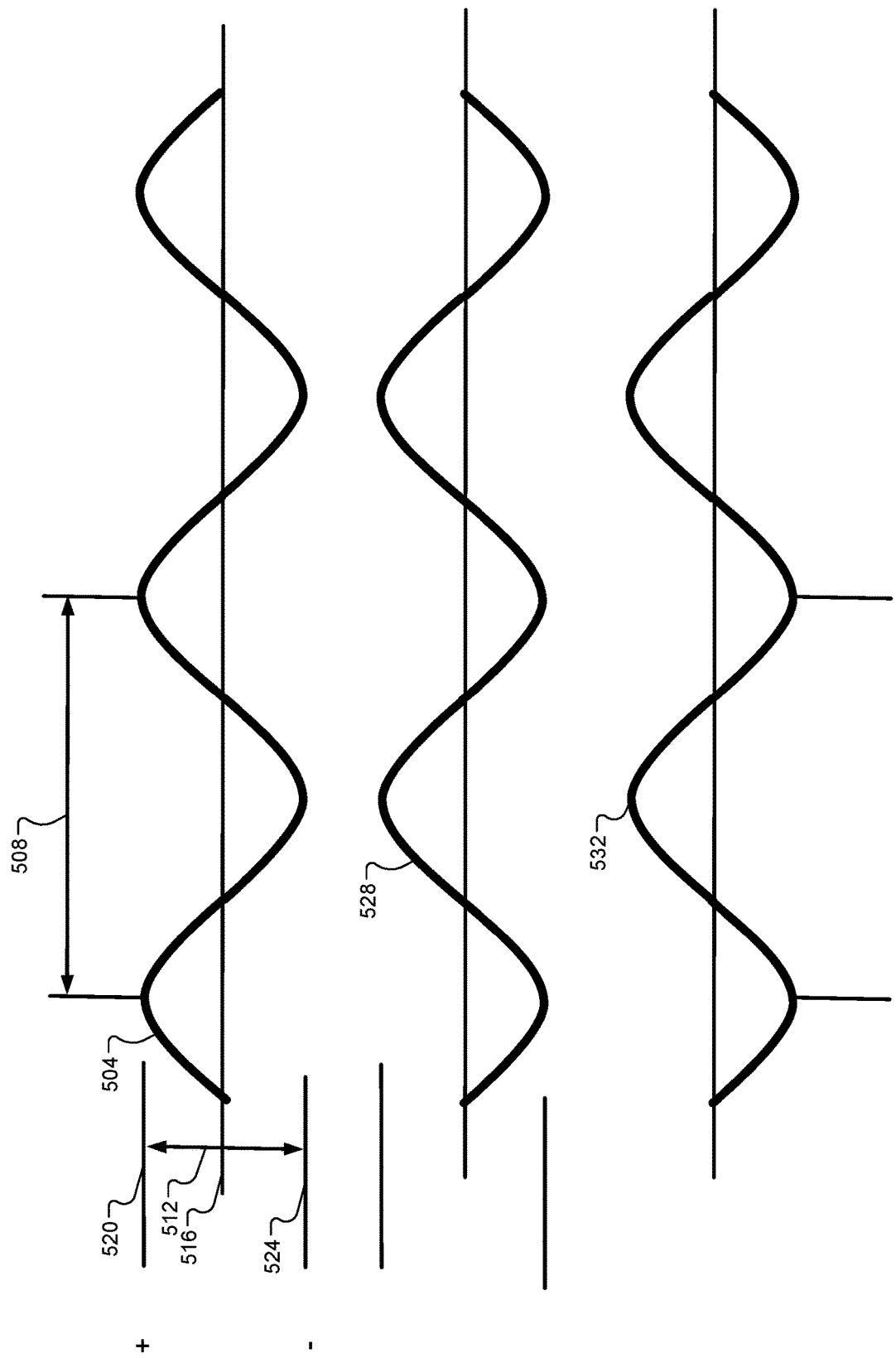
FIG. 5 includes a graph including an example gate voltage, an example resistance, and an example voltage across a switch over time.

FIG. 5 includes a graph including an example gate voltage 504 over time applied to the gate of the switch 408. As stated above, the switch control module 240 varies the gate voltage 504 at a frequency using the predetermined peak-to-peak voltage. The frequency corresponds to a period 508 between positive peaks. An example of the predetermined peak-to-peak voltage is illustrated by 512 in FIG. 5. The switch control module 240 oscillates the gate voltage 504 between a target gate voltage 516 plus ½ (one-half) of the predetermined peak-to-peak voltage and the target gate voltage 516 minus ½ (one-half) of the predetermined peak-to-peak voltage. The target gate voltage 516 plus ½ (one-half) of the predetermined peak-to-peak voltage is illustrated by 520 in FIG. 5. The target gate voltage 516 minus ½ (one-half) of the predetermined peak-to-peak voltage is illustrated by 524 in FIG. 5. Over one period, the gate voltage 504 is approximately equal to the target gate voltage 516.

While the example of a sine wave is provided, the switch control module 240 may vary the gate voltage 504 using a triangular wave, a square wave, or another suitable waveform. Also, while the example of varying the gate voltage 504 above and below the target voltage 516 is provided, the switch control module 240 may alternatively vary the gate voltage 504 only to above the target voltage 516 at the frequency or only to below the gate voltage 504 at the frequency.

Trace 528 tracks resistance of the switch 408 over time. As illustrated, the resistance of the switch 408 also varies between a first resistance (R1) and a second resistance (R2) as the gate voltage 504 varies.

As shown in FIG. 4, the switch control module 240 determines a voltage across the switch 408. For example, the switch control module 240 may determine the voltage across the switch 408 based on a difference between an input voltage (Vin) 410 at a first node 412 and an output voltage (Vout) 414 at a second node 416. A first voltage sensor 414 measures the input voltage 410 at the first node 412. A second voltage sensor 415 measures the output voltage 414 at the second node 416.

Trace 532 tracks the voltage across the switch 408 in FIG. 5. The voltage across the switch 408 should oscillate at the frequency if the switch 408 does not include a fault. If the switch 408 has a fault, the voltage across the switch 408 may not oscillate at the frequency.

The switch control module 240 monitors the voltage across the switch 408 over time. The switch control module 240 determines whether a fault is present in the switch 408 based on whether the voltage across the switch 408 oscillates at the frequency. The switch control module 240 may indicate that the fault is present in the switch 408 when the voltage across the switch 408 does not oscillate at the frequency. The switch control module 240 may indicate that the fault is not present in the switch 408 when the voltage across the switch 408 oscillates at the frequency.

The switch control module 240 may take one or more remedial actions when the fault is present in the switch 408. For example, the switch control module 240 may store a predetermined diagnostic trouble code (DTC) in memory 420. The predetermined DTC may be indicative of the fault in the switch 408. Additionally or alternatively, the switch control module 240 may illuminate a malfunction indicator (MI) 424. The malfunction indicator 424 may be, for example, a light that is visible within a passenger cabin of the vehicle, a message displayed on a display, or another suitable malfunction indicator. Additionally or alternatively, the switch control module 240 may electrically isolate the battery 404.

Figure 6:
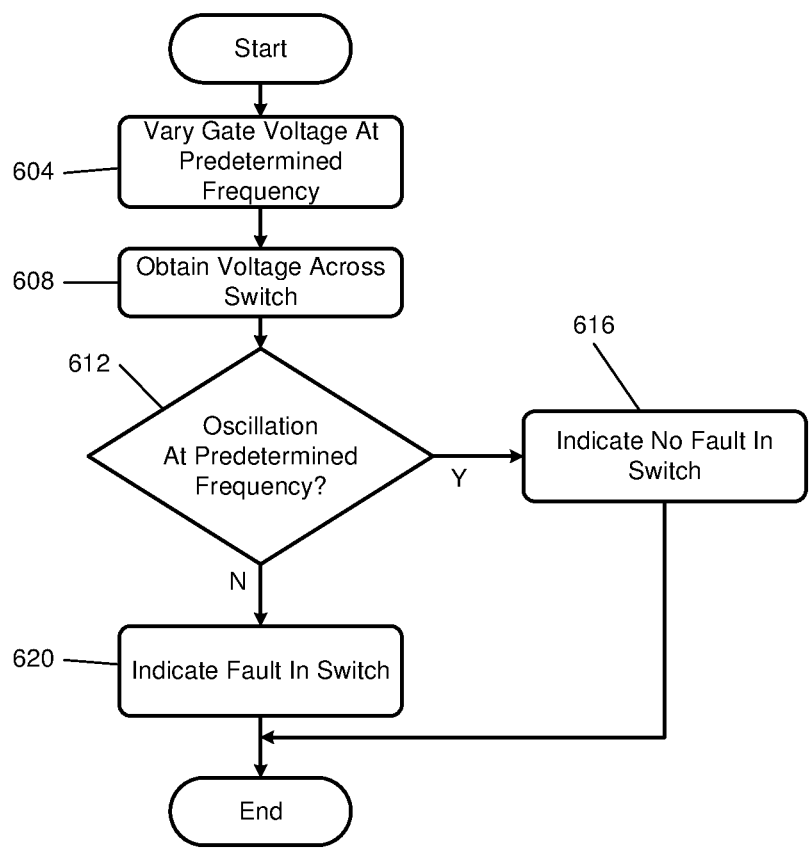
FIG. 6 is a flowchart depicting an example method of diagnosing a fault in a switch.

FIG. 6 includes a flowchart depicting an example method of diagnosing a fault in the switch 408. Control begins with 604 where the switch control module 240 varies the voltage applied to the gate of the switch 408 at the frequency. The switch control module 240 oscillates the gate voltage back and forth between a target voltage plus ½ (one-half) of the predetermined peak-to-peak voltage and the target voltage minus ½ (one-half) of the predetermined peak-to-peak voltage. The switch control module 240 may vary the target voltage over time.

At 608, the switch control module 240 obtains the voltage across the switch over time. At 612, the switch control module 240 determines whether the voltage across the switch 408 varies at the frequency. For example, the switch control module 240 may perform a Fourier Transform (e.g., a Fast Fourier Transform) on the voltage across the switch 408 over a predetermined period to determine whether the voltage across the switch 408 varies at the frequency. As another example, the switch control module 240 may compare the voltage across the switch with a threshold, track the period between crossings (positive or negative) of the threshold, and determine a frequency in the voltage across the switch based on the period between consecutive crossings of the threshold. If 612 is true, the switch control module 240 indicates that the fault is not present in the switch 408 at 616. If 612 is false, the switch control module 240 indicates that the fault is present in the switch 408 at 620.

Figure 7:
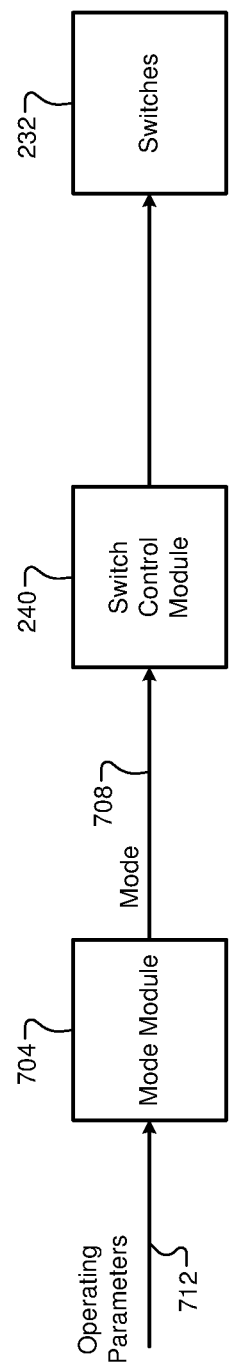
FIG. 7 includes a functional block diagram of an example capacity control system.

FIG. 7 is a functional block diagram of an example capacity control system. A mode module 704 sets an operating mode 708 based on one or more operating parameters 712. The switch control module 240 controls the switches 232 of the battery 208 based on the operating mode 708 to control how much of the total capacity of the battery 208 is connected to the first positive terminal 210, how much of the capacity of the battery 208 is connected to the second positive terminal 214, and how much of the capacity of the battery 208 is connected to the third positive terminal 216. The switch control module 240 also controls the switches 232 to impedance match the batteries 224.

Figure 8:
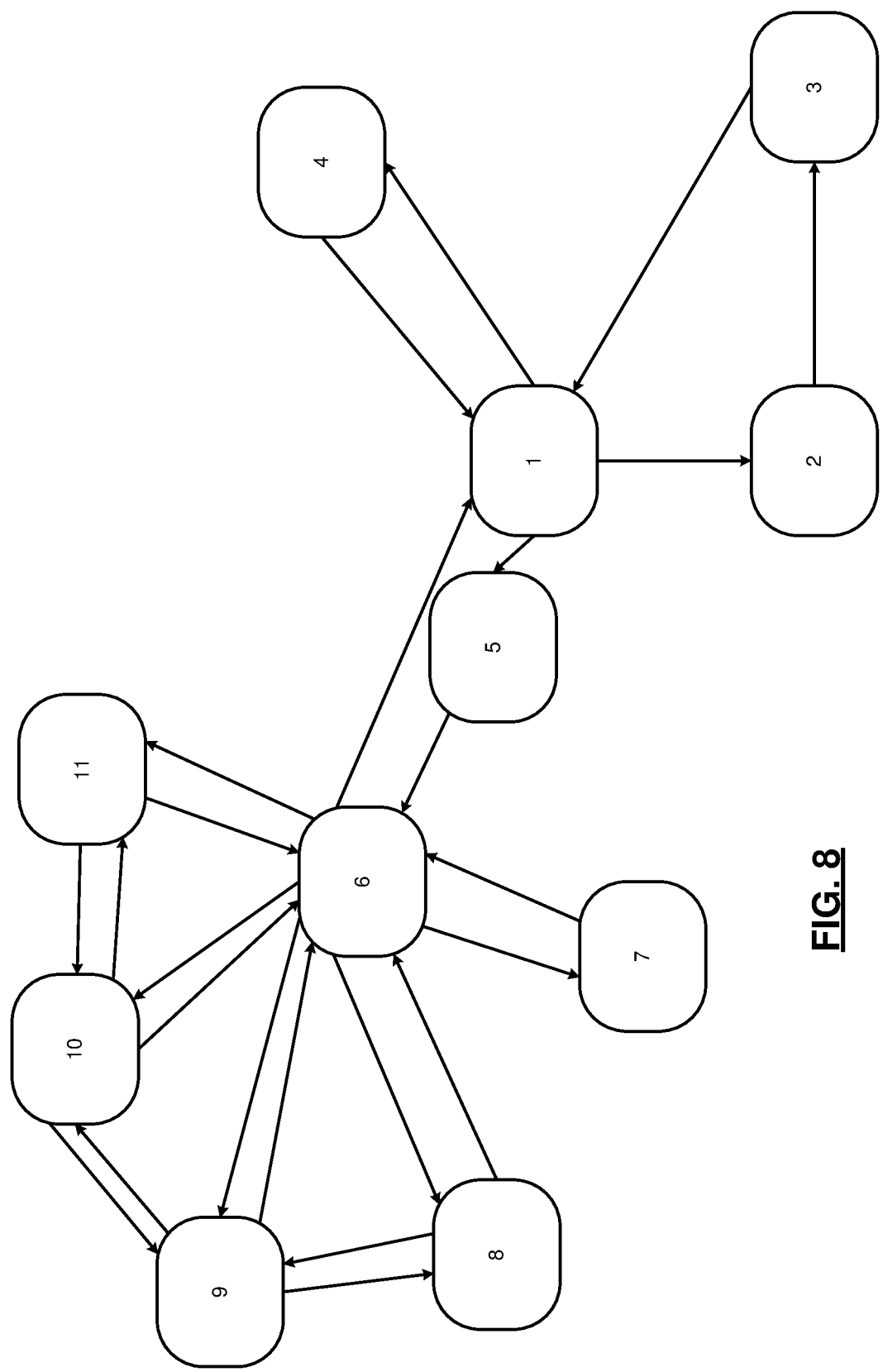
FIGS. 8, 9, and 10 are example state diagram illustrative of modes of operation and control of switches of a battery.

FIG. 8 is a state diagram illustrative of modes of operation and control of the switches. With respect to FIGS. 8 and 9, the mode module 704 sets the operating mode 708 to a first mode (e.g., a vehicle off mode), for example, when an ignition system of the vehicle is off. The first mode is illustrated by 1 in FIG. 8.

The mode module 704 may transition the operating mode 708 from the first mode to a second mode (e.g., a power off mode), for example, when at least one of: all of the batteries 224 are disconnected from the first positive terminal 210; all of the batteries 224 are disconnected from the second positive terminal 214; and all of the batteries 224 are disconnected from the third positive terminal 216. The second mode is illustrated by 2 in FIG. 8.

The mode module 704 may transition the operating mode 708 from the second mode to a third mode (e.g., a pre-charge mode), for example, when at least one of the batteries 224 is transitioned to being connected to one of the positive terminals following all of the batteries 224 being disconnected from that positive terminal. In other words, the mode module 704 may transition the operating mode 708 from the second mode to the third mode when a pre-charge circuit is conducting pre-charging. The third mode is illustrated by 3 in FIG. 8.

The mode module 704 may transition the operating mode 708 from the third mode to the first mode when the pre-charging is complete.

The mode module 704 may transition the operating mode 708 from the first mode to a fourth mode (e.g., an auxiliary mode), for example, when the ignition system is in an auxiliary state. The engine 102 may not be running in the auxiliary state, but some vehicle electronic components may be powered. The fourth mode is illustrated by 4 in FIG. 8.

The mode module 704 may transition the operating mode 708 to a fifth mode (e.g., a cranking mode) during cranking of the engine 102. The fifth mode is illustrated by 5 in FIG. 8. The mode module 704 may transition the operating mode 708 to a sixth mode (e.g., a run mode), for example, when the engine 102 reaches the running state after cranking. The sixth mode is illustrated by 6 in FIG. 8.

The mode module 704 may transition the operating mode 708 to a seventh mode, for example, during the auto-stop portion of an auto-stop/start event. The mode module 704 may transition the operating mode 708 from the seventh mode to the fifth mode for the auto-start portion of the auto-stop/start event. The seventh mode is illustrated by 7 in FIG. 8. The mode module 704 may transition the operating mode 708 to an eighth mode, for example, based on at least one of a brake pedal position (BPP), an accelerator pedal position (APP), a state of charge (SOC) of the battery 208, a temperature of the battery, and one or more other ones of the operating parameters 712. The eighth mode is illustrated by 8 in FIG. 8.

The mode module 704 may transition the operating mode 708 to a ninth mode, for example, based on at least one of the BPP, the APP, the SOC of the battery 208, the temperature of the battery, and one or more other ones of the operating parameters 712. The ninth mode is illustrated by 9 in FIG. 8.

The mode module 704 may transition the operating mode 708 to a tenth mode, for example, based on at least one of the BPP, the APP, the SOC of the battery 208, the temperature of the battery, and one or more other ones of the operating parameters 712. The tenth mode is illustrated by 10 in FIG. 8. The mode module 704 may transition the operating mode 708 to an eleventh mode, for example, based on at least one of the BPP, the APP, the SOC of the battery 208, the temperature of the battery, and one or more other ones of the operating parameters 712. The eleventh mode is illustrated by 11 in FIG. 8.

Figure 9:
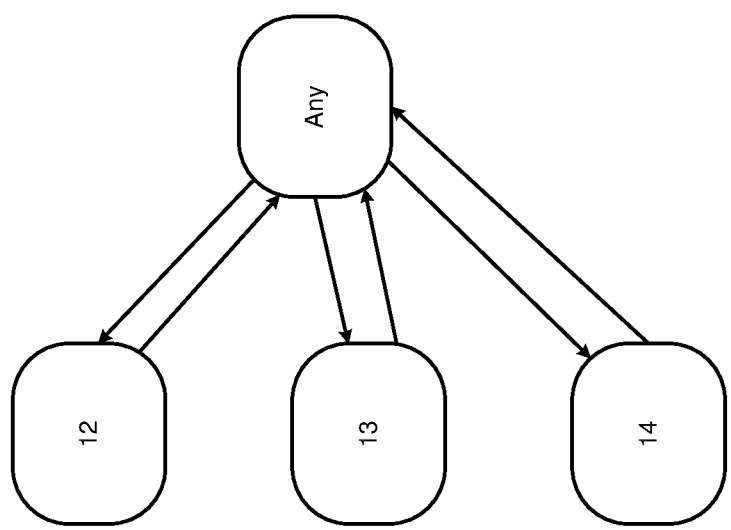

FIG. 9 includes a state diagram including additional modes of operation. For example, the mode module 704 may transition the operating mode 708 from any other mode to a twelfth mode, for example, when the voltage at the first positive terminal 210 and the first negative terminal 212 is above a predetermined upper limit voltage or less than a predetermined lower limit voltage. The twelfth mode is illustrated by 12 in FIG. 9.

The mode module 704 may transition the operating mode 708 from any other mode to a thirteenth mode, for example, when the voltage at the second positive terminal 214 and the second negative terminal 220 is above a predetermined upper limit voltage or less than a predetermined lower limit voltage. The thirteenth mode is illustrated by 13 in FIG. 9.

The mode module 704 may transition the operating mode 708 from any other mode to a fourteenth mode, for example, when the voltage at the third positive terminal 216 and the second negative terminal 220 is above a predetermined upper limit voltage or less than a predetermined lower limit voltage. The fourteenth mode is illustrated by 14 in FIG. 9.

Figure 10:
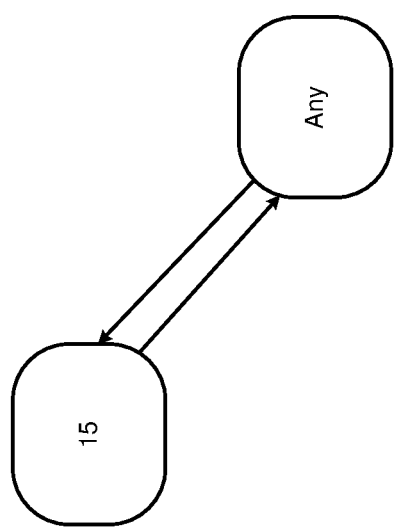

The mode module 704 may transition the operating mode 708 from any other mode to a fifteenth mode, for example, when a fault is diagnosed in a charging source of the battery 208. The fifteenth mode is illustrated by 15 in FIG. 10. Examples of charging sources of the battery 208 include the generator 206, the starter motor 202 (in the example of the starter motor 202 being a belt alternator starter that also generates power), and the high voltage battery 350 and the APM 354. The mode module 704 may determine that a fault is diagnosed in a charging source of the battery 208, for example, in response to the diagnosis of a fault in the charging source via another module. For example, the mode module 704 may determine that a fault is diagnosed in a charging source of the battery 208 in response to the setting of a predetermined diagnostic trouble code (DTC) in memory where the predetermined DTC being set is indicative of the fault in the charging source. Alternatively, the battery 208 may include a fault module that diagnoses faults in charging sources of the battery 208. For example, the fault module may diagnose a fault in a charging source of the battery 208 when a request for charging from the charging source is made and charging less than requested (or zero charging) is performed by that charging source.

The mode module 704 may transition the operating mode 708 to a sixteenth mode (e.g., a regeneration/boost mode), for example, during regeneration. Mechanical energy that is converted into electrical energy during regeneration may be used to charge the battery 208.

The mode module 704 may transition the operating mode 708 to a seventeenth mode (e.g., an auxiliary—high power accessory mode), for example, for use of a high power (e.g., 48 V) accessory during operation in the auxiliary mode.

The mode module 704 may transition the operating mode 708 from any other mode to an eighteenth mode, for example, when a fault associated with the second positive terminal 214 is diagnosed. The mode module 704 may transition the operating mode 708 from any other mode to a nineteenth mode, for example, when a fault associated with the third positive terminal 216 is diagnosed.

When the operating mode 708 is in the first mode, the switch control module 240 controls the switches 232 of the battery 208 based on a first predetermined capacity allotment. The first predetermined capacity allotment may include, for example, connecting the entire capacity of the battery 208 to the second positive terminal 214 and the second negative terminal 220. No capacity of the battery 208 will be connected to the third positive terminal 216 or the first positive terminal 210 in the first predetermined capacity allotment. Alternatively, the first predetermined capacity allotment may include, for example, connecting the entire capacity of the battery 208 to the second positive terminal 214, the third positive terminal 216, and the second negative terminal 220. No capacity of the battery 208 will be connected to the first positive terminal 210 in the first predetermined capacity allotment.

When the operating mode 708 is in the second mode, the switch control module 240 controls the switches 232 of the battery 208 based on a second predetermined capacity allotment. The second predetermined capacity allotment may include, for example, connecting none of the capacity of the battery 208 to one of the terminals that is to be disconnected from a positive terminal. The entire capacity of the battery 208 may be connected to no positive terminals or to other positive terminals that are not to be disconnected. Alternatively, the second predetermined capacity allotment may include, for example, connecting the entire capacity of the battery 208 to the second positive terminal 214, the third positive terminal 216, and the second negative terminal 220. No capacity of the battery 208 will be connected to the first positive terminal 210 in the second predetermined capacity allotment.

When the operating mode 708 is in the third mode, the switch control module 240 controls the switches 232 of the battery 208 based on a third predetermined capacity allotment. The third predetermined capacity allotment may include, for example, connecting a first predetermined portion of the total capacity of the battery 208 to one of the positive terminals that is to be connected.

When the operating mode 708 is in the third mode, the switch control module 240 controls the switches 232 of the battery 208 based on a third predetermined capacity allotment. The third predetermined capacity allotment may include, for example, connecting a first predetermined portion of the total capacity of the battery 208 to one of the positive terminals that is to be connected. The first predetermined portion may be greater than zero and less than 100 percent of the total capacity of the battery 208.

When the operating mode 708 is in the fourth mode, the switch control module 240 controls the switches 232 of the battery 208 based on a fourth predetermined capacity allotment. The fourth predetermined capacity allotment may include, for example, connecting the total capacity of the battery 208 to the second positive terminal 214. No capacity of the battery 208 will be connected to the third positive terminal 216 or the first positive terminal 210 in the fourth predetermined capacity allotment. Alternatively, the fourth predetermined capacity allotment may include, for example, connecting the total capacity of the battery 208 to the second positive terminal 214 and the third positive terminal 216. No capacity of the battery 208 will be connected to the first positive terminal 210 in the fourth predetermined capacity allotment.

When the operating mode 708 is in the fifth mode, the switch control module 240 controls the switches 232 of the battery 208 based on a fifth predetermined capacity allotment. The fifth predetermined capacity allotment may include, for example, connecting the total capacity of the battery 208 to the second positive terminal 214. No capacity of the battery 208 will be connected to the third positive terminal 216 or the first positive terminal 210 in the fifth predetermined capacity allotment. Alternatively, the fifth predetermined capacity allotment may include, for example, connecting the total capacity of the battery 208 to the third positive terminal 216. No capacity of the battery 208 will be connected to the second positive terminal 214 or the first positive terminal 210 in the fifth predetermined capacity allotment.

When the operating mode 708 is in the sixth mode, the switch control module 240 controls the switches 232 of the battery 208 based on a sixth predetermined capacity allotment. The sixth predetermined capacity allotment may include, for example, connecting second, third, and fourth predetermined portions of the total capacity of the battery 208 to the first, second, and third positive terminals 210, 214, and 216, respectively. The second predetermined portion may be, for example, approximately one ninth of the total capacity of the battery 208, the third predetermined portion may be approximately one third of the total capacity of the battery 208, and the fourth predetermined portion may be approximately two ninths of the total capacity of the battery 208. Alternatively, the second predetermined portion may be, for example, approximately one ninth of the total capacity of the battery 208, the third predetermined portion may be approximately five ninths of the total capacity of the battery 208, and the fourth predetermined portion may be approximately five ninths of the total capacity of the battery 208. As used herein, approximately may be +/−10%.

When the operating mode 708 is in the seventh mode, the switch control module 240 controls the switches 232 of the battery 208 based on a seventh predetermined capacity allotment. The seventh predetermined capacity allotment may include, for example, connecting a fifth, sixth, and seventh predetermined portions of the total capacity of the battery 208 to the first, second, and third positive terminals, 210, 214, and 216, respectively. The fifth predetermined portion may be, for example, approximately zero percent of the total capacity of the battery 208, the sixth predetermined portion may be approximately five sixths of the total capacity of the battery 208, and the seventh predetermined portion may be approximately one sixth of the total capacity of the battery 208. Alternatively, the fifth predetermined portion may be, for example, approximately zero percent of the total capacity of the battery 208, the sixth predetermined portion may be approximately one ninth of the total capacity of the battery 208, and the seventh predetermined portion may be approximately eight ninths of the total capacity of the battery 208.

When the operating mode 708 is in the eighth mode, the switch control module 240 controls the switches 232 of the battery 208 based on an eighth predetermined capacity allotment. The eighth predetermined capacity allotment may include, for example, connecting eighth, ninth, and tenth predetermined portions of the total capacity of the battery 208 to the first, second, and third positive terminals, 210, 214, and 216, respectively. The eighth predetermined portion may be, for example, approximately one sixth of the total capacity of the battery 208, the ninth predetermined portion may be approximately one half of the total capacity of the battery 208, and the tenth predetermined portion may be approximately one third of the total capacity of the battery 208.

When the operating mode 708 is in the ninth mode, the switch control module 240 controls the switches 232 of the battery 208 based on a ninth predetermined capacity allotment. The ninth predetermined capacity allotment may include, for example, connecting eleventh, twelfth, and thirteenth predetermined portions of the total capacity of the battery 208 to the first, second, and third positive terminals, 210, 214, and 216, respectively. The eleventh predetermined portion may be, for example, approximately one third of the total capacity of the battery 208, the twelfth predetermined portion may be approximately one third of the total capacity of the battery 208, and the thirteenth predetermined portion may be approximately one third of the total capacity of the battery 208.

When the operating mode 708 is in the tenth mode, the switch control module 240 controls the switches 232 of the battery 208 based on a tenth predetermined capacity allotment. The tenth predetermined capacity allotment may include, for example, connecting fourteenth, fifteenth, and sixteenth predetermined portions of the total capacity of the battery 208 to the first, second, and third positive terminals, 210, 214, and 216, respectively. The fourteenth predetermined portion may be, for example, approximately one half of the total capacity of the battery 208, the fifteenth predetermined portion may be approximately one third of the total capacity of the battery 208, and the sixteenth predetermined portion may be approximately one sixth of the total capacity of the battery 208.

When the operating mode 708 is in the eleventh mode, the switch control module 240 controls the switches 232 of the battery 208 based on an eleventh predetermined capacity allotment. The eleventh predetermined capacity allotment may include, for example, connecting seventeenth, eighteenth, and nineteenth predetermined portions of the total capacity of the battery 208 to the first, second, and third positive terminals, 210, 214, and 216, respectively. The seventeenth predetermined portion may be, for example, approximately two thirds of the total capacity of the battery 208, the eighteenth predetermined portion may be approximately one sixth of the total capacity of the battery 208, and the nineteenth predetermined portion may be approximately one sixth of the total capacity of the battery 208.

When the operating mode 708 is in the twelfth mode, the switch control module 240 controls the switches 232 of the battery 208 based on a twelfth predetermined capacity allotment. The twelfth predetermined capacity allotment may include, for example, connecting twentieth, twenty first, and twenty second predetermined portions of the total capacity of the battery 208 to the first, second, and third positive terminals, 210, 214, and 216, respectively. The twentieth predetermined portion may be, for example, approximately zero percent of the total capacity of the battery 208, the twenty first predetermined portion may be approximately one half of the total capacity of the battery 208, and the twenty second predetermined portion may be approximately one half of the total capacity of the battery 208.

When the operating mode 708 is in the thirteenth mode, the switch control module 240 controls the switches 232 of the battery 208 based on a thirteenth predetermined capacity allotment. The thirteenth predetermined capacity allotment may include, for example, connecting twenty third, twenty fourth, and twenty fifth predetermined portions of the total capacity of the battery 208 to the first, second, and third positive terminals, 210, 214, and 216, respectively. The twenty third predetermined portion may be, for example, approximately one sixth of the total capacity of the battery 208, the twenty fourth predetermined portion may be approximately zero percent of the total capacity of the battery 208, and the twenty fifth predetermined portion may be approximately five sixths of the total capacity of the battery 208.

When the operating mode 708 is in the fourteenth mode, the switch control module 240 controls the switches 232 of the battery 208 based on a fourteenth predetermined capacity allotment. The fourteenth predetermined capacity allotment may include, for example, connecting twenty sixth, twenty seventh, and twenty eighth predetermined portions of the total capacity of the battery 208 to the first, second, and third positive terminals, 210, 214, and 216, respectively. The twenty sixth predetermined portion may be, for example, approximately one sixth of the total capacity of the battery 208, the twenty seventh predetermined portion may be approximately five sixths of the total capacity of the battery 208, and the twenty eighth predetermined portion may be approximately zero percent of the total capacity of the battery 208.

When the operating mode 708 is in the fifteenth mode, the switch control module 240 controls the switches 232 of the battery 208 based on a fifteenth predetermined capacity allotment. The fifteenth predetermined capacity allotment may include, for example, connecting twenty ninth, thirtieth, and thirty first predetermined portions of the total capacity of the battery 208 to the first, second, and third positive terminals, 210, 214, and 216, respectively. The twenty ninth predetermined portion may be, for example, approximately one ninth of the total capacity of the battery 208, the thirtieth predetermined portion may be approximately five ninths of the total capacity of the battery 208, and the thirty first predetermined portion may be approximately one ninth of the total capacity of the battery 208. Alternatively, the twenty ninth predetermined portion may be, for example, approximately one ninth of the total capacity of the battery 208, the thirtieth predetermined portion may be approximately one ninth of the total capacity of the battery 208, and the thirty first predetermined portion may be approximately five ninths of the total capacity of the battery 208. Alternatively, the twenty ninth predetermined portion may be, for example, approximately one ninth of the total capacity of the battery 208, the thirtieth predetermined portion may be approximately five ninths of the total capacity of the battery 208, and the thirty first predetermined portion may be approximately five ninths of the total capacity of the battery 208.

When the operating mode 708 is in the sixteenth mode, the switch control module 240 controls the switches 232 of the battery 208 based on a sixteenth predetermined capacity allotment. The sixteenth predetermined capacity allotment may include, for example, connecting thirty second, thirty third, and thirty fourth predetermined portions of the total capacity of the battery 208 to the first, second, and third positive terminals, 210, 214, and 216, respectively. The thirty second predetermined portion may be, for example, approximately two ninths of the total capacity of the battery 208, the thirty third portion may be approximately one ninth of the total capacity of the battery 208, and the thirty fourth predetermined portion may be approximately one ninth of the total capacity of the battery 208.

When the operating mode 708 is in the seventeenth mode, the switch control module 240 controls the switches 232 of the battery 208 based on a seventeenth predetermined capacity allotment. The seventeenth predetermined capacity allotment may include, for example, connecting thirty fifth, thirty sixth, and thirty seventh predetermined portions of the total capacity of the battery 208 to the first, second, and third positive terminals, 210, 214, and 216, respectively. The thirty fifth predetermined portion may be, for example, approximately one ninth of the total capacity of the battery 208, the thirty sixth portion may be approximately five ninths of the total capacity of the battery 208, and the thirty seventh predetermined portion may be approximately five ninths of the total capacity of the battery 208.

When a fault is detected in one of the batteries 224, the switch control module 240 electrically isolates that one of the batteries 224 and prevents that one of the batteries 224 from being connected to any of the positive terminals directly or indirectly. The switch control module 240 also updates (decreases) the total capacity of the battery 208 when a fault is present in one of the batteries 224. When a fault is detected in one of a plurality of the batteries 224 used to output power to the first positive terminal 210, the switch control module 240 electrically isolates that one of the batteries 224 and connects one or more other ones of the batteries 224 to provide the same power output to the first positive terminal 210.

Figure 11:
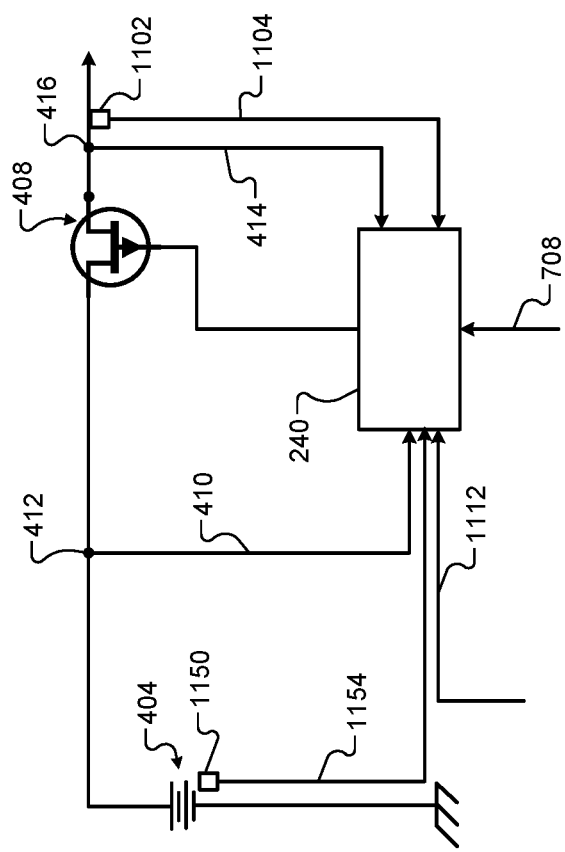
FIG. 11 includes a schematic including a switch control module, a battery, and a switch.

FIG. 11 includes a schematic including the switch control module 240, the battery 404, and the switch 408. The switch control module 240 may control the switches that connect the batteries 224 to a positive terminal to adjust currents (to or from) of sets of two or more of the batteries 224 that are connected in parallel to that positive terminal. In the example of the second and third positive terminals 214 and 216, individual ones of the batteries 224 are connected in parallel to the second and third positive terminals 214 and 216. In the example of the first positive terminal 212, two or more sets of 4 series connected ones of the batteries 224 are connected in parallel to the first positive terminal 212.

The switch control module 240 determines whether to perform the impedance matching based on the operating mode 708. For example, the switch control module 240 may perform the impedance matching when the operating mode 708 is in a first one or more of the modes. The switch control module 240 may not perform the impedance matching when the operating mode 708 is in a second one or more of the modes. For example, the switch control module 240 may not perform the impedance matching when the operating mode 708 is in the first mode, the second mode, or the fifth mode. The switch control module 240 may perform the impedance matching when the operating mode 708 is in any of the other modes discussed above.

The switch control module 240 may selectively vary the voltage applied to the switch 408 to impedance match the battery 404 with one or more other batteries connected in parallel with the battery 404. The switch control module 240 may additionally or alternatively selectively vary the voltages applied to the switches associated with the one or more other batteries. The variation of the voltage applied to the gates of the switches may adjust currents of each of the batteries to be approximately equal. The variation of the voltage applied to the gates of the switches may also adjust resistances of the switches such that impedances of each of the batteries and switches connected in series is approximately equal.

Figure 12:
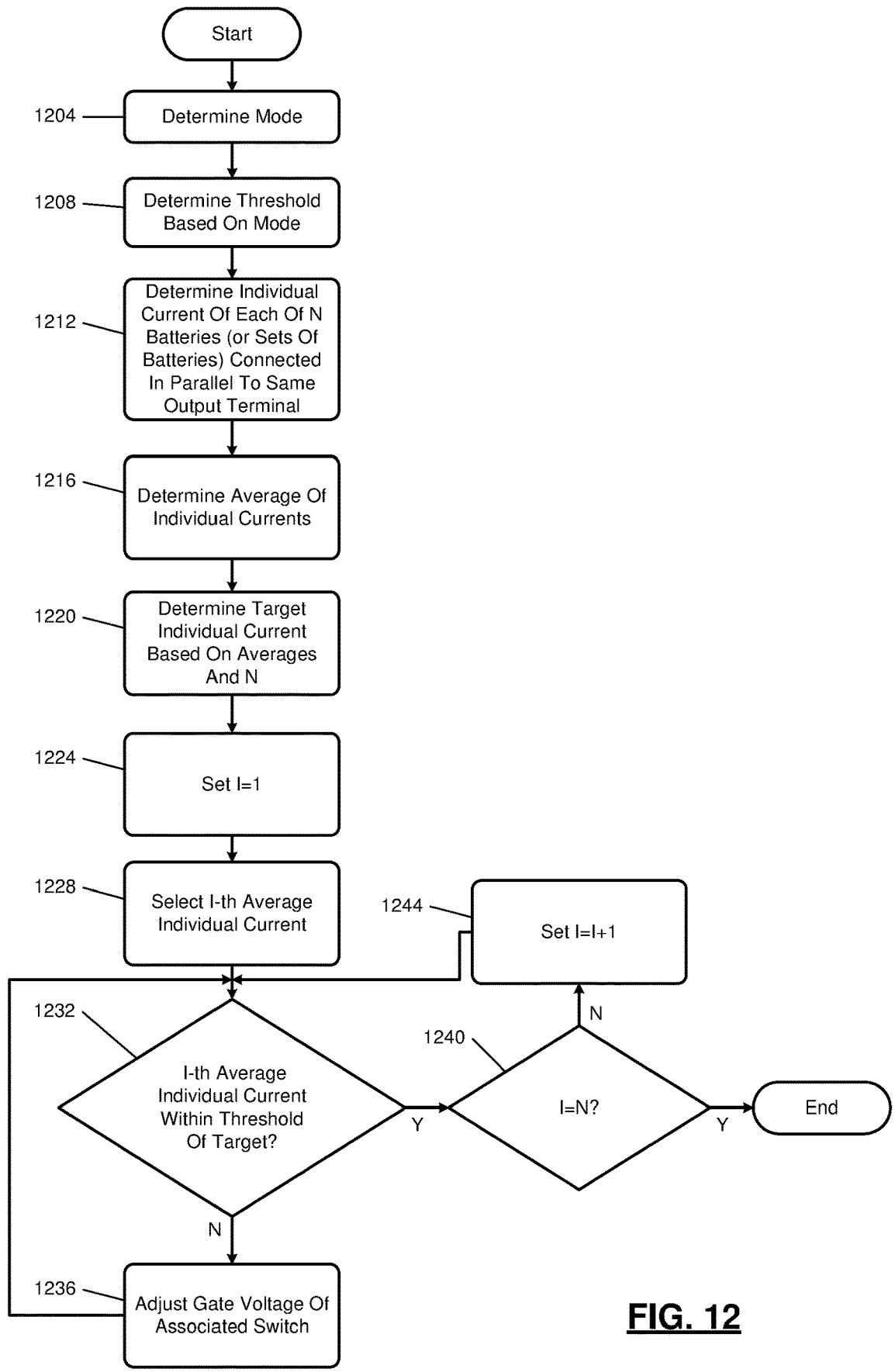
FIGS. 12 and 13 include flowcharts depicting example methods of varying gate voltage of N switches associated with N of batteries (or N sets of two or more series connected batteries) connected in parallel to a positive terminal via the N switches, respectively.

FIG. 12 includes a flowchart depicting an example method of varying gate voltage of N switches associated with N of the batteries 224 (or N sets of two or more series connected batteries) connected in parallel to a positive terminal via the N switches, respectively. N is an integer greater than 1. Control begins with 1204 where the mode module 704 sets the operating mode 708.

At 1208, the switch control module 240 determines a current threshold based on the operating mode 708. For example, the switch control module 240 may set the current threshold to a first predetermined current when the operating mode 708 is set to one of the modes where impedance matching is to be performed. The switch control module 240 may set the current threshold to a second predetermined current when the operating mode 708 is set to one of the modes where impedance matching is not to be performed. The second predetermined current is greater than the first predetermined current and may be 100 amps or greater. The first predetermined current is less than the second predetermined current and may be 5 amps or less (e.g., 0-5 amps).

At 1212, the switch control module 240 determines N individual currents of each of the N individual batteries (or N sets of two or more series connected batteries) that are connected in parallel to the positive terminal via the N switches, respectively. For example, a current sensor 1102 may measure an individual current 1104 through the second node 416 to measure the individual current from the battery 404. Output currents from the positive terminals 210, 214, and 216 may be measured using output current sensors 1108 illustrated in FIGS. 3A and 3C. An example output current is illustrated by 1112 in FIG. 11. Alternatively, an output current from a positive terminal may be determined by summing the N individual currents of the N individual batteries (or N sets of two or more series connected batteries) that are connected to that positive terminal.

At 1216, the switch control module 240 determines N averages of the N individual currents, respectively, over a predetermined period. At 1220, the switch control module 1220 may determine the output current through the positive terminal. For example, the output current may be measured using a current sensor or determined based on a sum of the N averages. At 1220, the switch control module 1220 determines a target individual current based on the output current through the positive terminal divided by N. For example, the switch control module 1220 may set the target individual current based on or equal to the output current divided by N.

At 1224, the switch control module 240 sets a counter value (I) equal to 1. At 1228, the switch control module 240 selects the I-th one of the N averages of the I-th one of the N individual batteries (or N sets of two or more series connected batteries). At 1232, the switch control module 240 determines whether the I-th one of the N average individual currents is within the threshold of the target individual current. If 1232 is true, control transfers to 1240. If 1232 is false, control continues with 1236.

At 1236, the switch control module 240 controls the voltage applied to the gate of the switch associated with the I-th one of the N individual batteries (or N sets of two or more series connected batteries) to adjust the I-th one of the N average individual currents to within the threshold of the target individual current. For example, when the I-th one of the N average individual currents is less than the target individual current, the switch control module 240 may increase the gate voltage to decrease the resistance of the switch and to increase the I-th one of the N average individual currents. When the I-th one of the N average individual currents is greater than the target individual current, the switch control module 240 may decrease the gate voltage to increase the resistance of the switch and to decrease the I-th one of the N average individual currents. Control may return to 1232 or transfer to 1240 after 1236.

At 1240, the switch control module 240 may determine whether the counter value I is equal to N. If 1240 is false, the switch control module 240 may increment the counter value by 1 (e.g., set the counter value I=I+1) at 1244, and control may return to 1232. If 1240 is true, control may end. While control is shown as ending, control may return to 1204.

Figure 13:
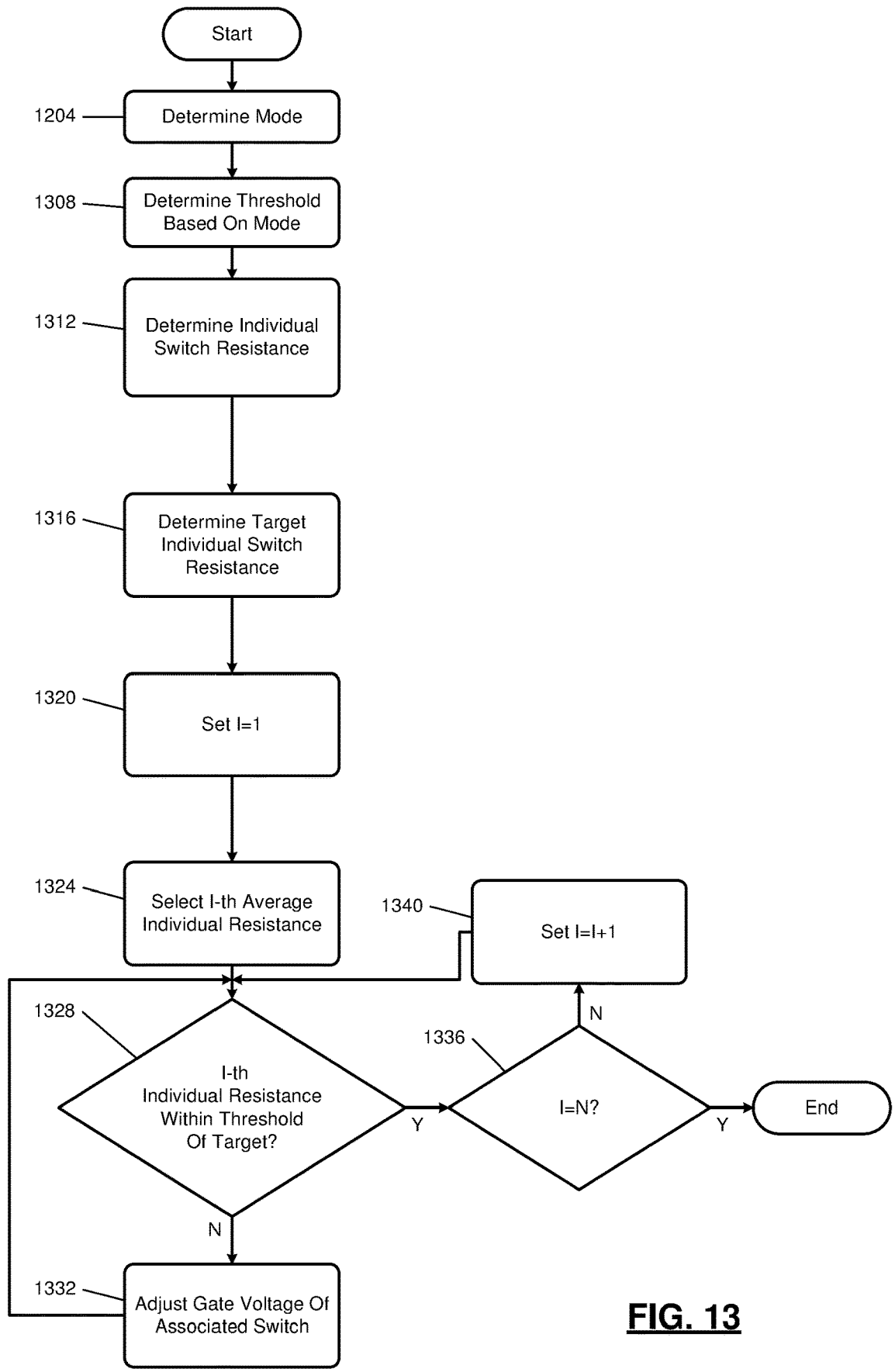

In various implementations, the switch control module 240 may adjust the gate voltages of the N switches to adjust the N individual resistances of the N switches to within the threshold (resistance) of a target resistance. FIG. 13 includes a flowchart depicting an example method of varying gate voltage of N switches associated with N of the batteries 224 (or N sets of two or more series connected batteries) connected in parallel to a positive terminal via the N switches, respectively. N is an integer greater than 1.

Control begins with 1204 where the mode module 704 sets the operating mode 708. At 1308, the switch control module 240 determines a resistance threshold based on the operating mode 708. For example, the switch control module 240 may set the resistance threshold to a first predetermined resistance when the operating mode 708 is set to one of the modes where impedance matching is to be performed. The switch control module 240 may set the resistance threshold to a second predetermined resistance when the operating mode 708 is set to one of the modes where impedance matching is not to be performed. The second predetermined resistance is greater than the first predetermined resistance.

At 1312, the switch control module 240 determines N individual resistances of each of the N switches, respectively. For example, the switch control module 240 may measure determine the individual resistance of one of the N switches based on the voltage across the switch and the current through the switch using Ohm's law (V=I*R).

At 1316, the switch control module 240 determines a target individual resistance based on a sum of the N individual resistances and N. For example, the switch control module 240 may set the target individual resistance based on or equal to the sum of the N individual resistances divided by N.

At 1320, the switch control module 240 sets a counter value (I) equal to 1. At 1324, the switch control module 240 selects the I-th one of the N individual resistances of the I-th one of the N switches. At 1328, the switch control module 240 determines whether the I-th one of the N individual resistances is within the threshold of the target individual resistance. If 1328 is true, control transfers to 1336. If 1328 is false, control continues with 1332.

At 1332, the switch control module 240 controls the voltage applied to the gate of the switch associated with the I-th one of the N switches to adjust the I-th one of the N individual resistances to within the threshold of the target individual resistance. For example, when the I-th one of the N individual resistances is less than the target individual resistance, the switch control module 240 may decrease the gate voltage to increase the resistance of the I-th one of the N switches. When the I-th one of the N individual resistances is greater than the target individual resistance, the switch control module 240 may increase the gate voltage to decrease the resistance of the I-th one of the N switches. Control may return to 1328 or transfer to 1336 after 1332.

At 1336, the switch control module 240 may determine whether the counter value I is equal to N. If 1336 is false, the switch control module 240 may increment the counter value by 1 (e.g., set the counter value I=I+1) at 1340, and control may return to 1328. If 1336 is true, control may end. While control is shown as ending, control may return to 1204.

Figure 14:
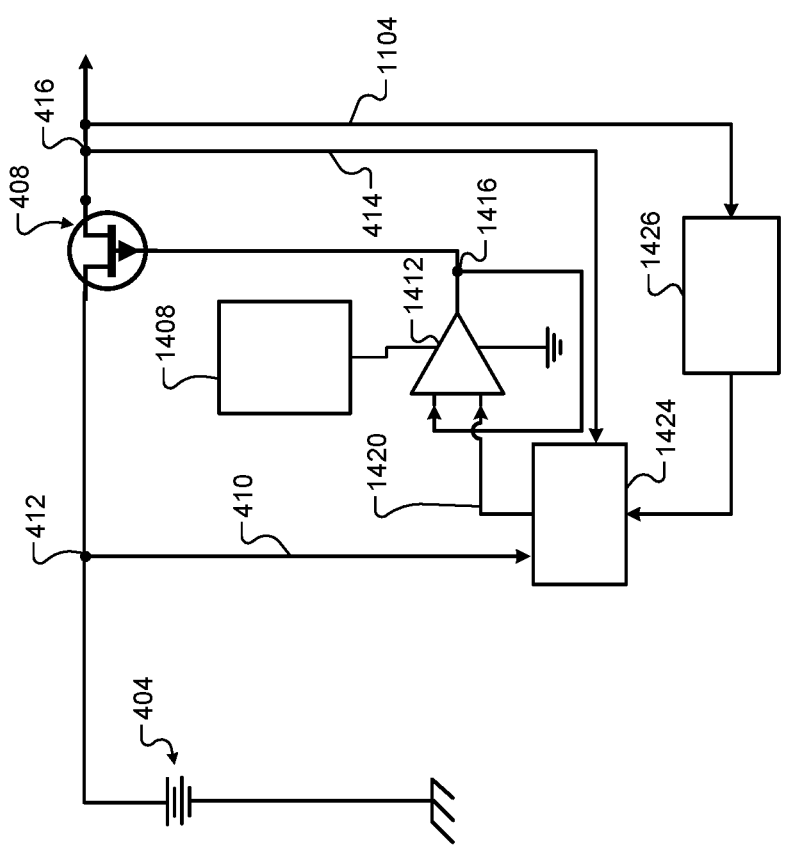
FIG. 14 is a schematic including an example implementation of an impedance matching circuit.

FIG. 14 is a schematic including an example implementation of an impedance matching circuit of the switch control module 240. The impedance matching circuit may include a charge pump 1408 that powers a comparator 1412. The comparator 1412 switches its output 1416 based on a comparison of the output 1416 and an output 1420 from a digital to analog converter (DAC) 1424. More specifically, the comparator 1412 sets the output 1416 to a first state (e.g., a high voltage, or digital 1) when the output of the DAC 1424 is greater than the output 1416. The comparator 1412 sets the output 1416 to a second state (e.g., a low voltage, or digital 0) when the output of the DAC 1424 is less than the output 1416. An analog to digital converter (ADC) 1426 converts analog current (I) measurements to digital values and supplies the digital values (corresponding to current) to the DAC 1424.

The switch 408 opens and closes based on the state of the output 1416. For example, the switch 408 closes when the output 1416 is in the first state and opens when the output 1416 is in the second state. The switch 408 connects the battery 404 (or a set of series connected batteries) to the positive terminal when the switch 408 is closed. When the switch 408 is open, the switch 408 disconnects the battery 404 from the positive terminal.

In various implementations, temperature sensors may be implemented with the batteries 224, respectively. The temperature sensor of a battery measures a temperature of that battery. For example, temperature sensor 1150 is illustrated in FIG. 11 measuring a temperature 1154 of the battery 404. The switch control module 240 may selectively vary the gate voltages of switches associated with batteries that are connected to the same positive terminal based on the temperatures of the batteries to minimize a temperature difference between ones of the batteries.

Figure 15:
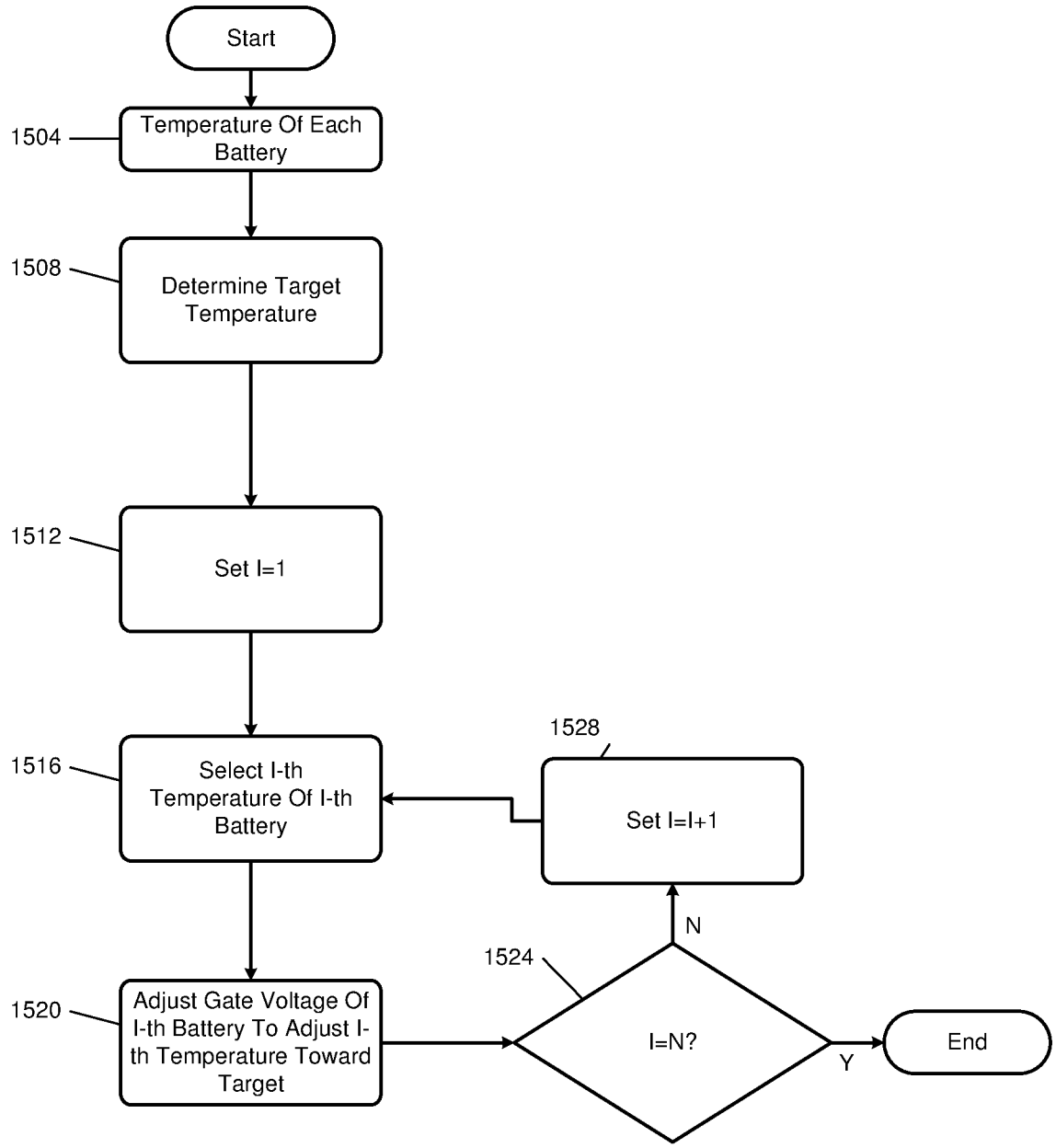
FIG. 15 includes a flowchart depicting an example method of varying gate voltage of N switches associated with N of batteries (or N sets of two or more series connected batteries) connected in parallel to a positive terminal via the N switches, respectively.

FIG. 15 includes a flowchart depicting an example method of varying gate voltage of N switches associated with N of the batteries 224 (or N sets of two or more series connected batteries) connected in parallel to a positive terminal via the N switches, respectively. N is an integer greater than 1. Control begins with 1504 where the switch control module 240 obtains the N temperatures of the N batteries 224, respectively.

At 1508, the switch control module 240 determines a target temperature for the N batteries 224 based on the N temperatures, respectively. For example, the switch control module 240 may set the target temperature based on or equal to an average of the N temperatures.

At 1512, the switch control module 240 sets a counter value (I) equal to 1. At 1516, the switch control module 240 selects the I-th one of the N temperatures of the I-th one of the N individual batteries (or N sets of two or more series connected batteries). At 1520, the switch control module 240 selectively adjusts the gate voltage of the I-th one of the N switches associated with the I-th one of the N individual batteries (or N sets of two or more series connected batteries) to adjust the I-th temperature toward the target temperature. For example, the switch control module 240 may increase gate voltage to decrease gate resistance and decrease the I-th temperature, and vice versa.

At 1524, the switch control module 240 may determine whether the counter value I is equal to N. If 1524 is false, the switch control module 240 may increment the counter value by 1 (e.g., set the counter value I=I+1) at 1528, and control may return to 1516. If 1524 is true, control may end. While control is shown as ending, control may return to 1504.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A battery, comprising:
   a first terminal;
   a second terminal;
   a plurality of individually housed batteries;
   a plurality of switches configured to connect ones of the individually housed batteries to and from ones of the first and second terminals; and
   a switch control module configured to:
      at a frequency, vary a voltage applied to a gate of one of the switches, the one of the switches configured to connect at least one of the individually housed batteries to one of the first and second terminals;
      diagnose whether a fault is present in the one of the switches based on a voltage across the one of the switches; and
      based on a current through one of the switches, selectively vary the voltage applied to a gate of the one of the switches to voltage values that are between (i) a first predetermined voltage corresponding to one of the switches being fully open and (ii) a second predetermined voltage corresponding to the one of the switches being fully closed, the one of the switches configured to connect at least one of the individually housed batteries to one of the first and second terminals.

2. The battery of claim 1 wherein the switch control module is configured to diagnose that the fault is present in the one of the switches when the voltage across the one of the switches does not vary at the frequency.

3. The battery of claim 1 wherein the switch control module is configured to diagnose that the fault is not present in the one of the switches when the voltage across the one of the switches varies at the frequency.

4. The battery of claim 1 wherein the switch control module is configured to store a predetermined diagnostic trouble code (DTC) in memory in response to diagnosing the fault in the one of the switches.

5. The battery of claim 1 wherein the switch control module is configured to illuminate a malfunction indicator in response to diagnosing the fault in the one of the switches.

6. The battery of claim 1 wherein the switch control module is further configured to:
   at a second frequency, vary a second voltage applied to a second gate of a second one of the switches, the second one of the switches configured to connect a second at least one of the individually housed batteries to one of the first and second terminals; and
   diagnose whether the fault is present in the second one of the switches based on a second voltage across the second one of the switches.

7. The battery of claim 6 wherein the frequency is one of:
   equal to the second frequency;
   greater than the second frequency; and
   less than the second frequency.

8. The battery of claim 1 wherein the frequency is a fixed predetermined frequency.

9. The battery of claim 1 wherein the plurality of individually housed batteries include a plurality of individually housed 12 Volt batteries.

10. A battery, comprising:
    a first terminal;
    a second terminal;
    a plurality of individually housed batteries;

a plurality of switches configured to connect ones of the individually housed batteries to and from ones of the first and second terminals; and a switch control module configured to, based on a current through one of the switches, selectively vary a voltage applied to a gate of the one of the switches to voltage values that are between (i) a first predetermined voltage corresponding to one of the switches being fully open and (ii) a second predetermined voltage corresponding to the one of the switches being fully closed, the one of the switches configured to connect at least one of the individually housed batteries to one of the first and second terminals.

11. The battery of claim 10 wherein the switch control module is configured to selectively vary the voltage applied to the gate of the one of the switches based on the current through the one of the switches and a second current through a second one of the switches, the second one of the switches configured to connect at least one other one of the individually housed batteries to the one of the first and second terminals.

12. The battery of claim 11 wherein the switch control module is further configured to selectively vary a second voltage applied to a second gate of the second one of the switches based on the current through the one of the switches and the second current through the second one of the switches.

13. The battery of claim 12 wherein the switch control module is configured to determine a target current based on the current and the second current and selectively vary the voltage applied to the gate of the one of the switches to adjust the current to within a predetermined value of the target current.

14. The battery of claim 13 wherein the switch control module is configured to increase the voltage applied to the gate when the current is less than the target current.

15. The battery of claim 14 wherein the switch control module is configured to decrease the voltage applied to the gate when the current is greater than the target current.

16. The battery of claim 13 further comprising a mode module configured to set an operating mode based on at least one operating parameter, wherein the switch control module is configured to set the predetermined value based on the operating mode.

17. The battery of claim 16 wherein the switch control module is configured to:
set the predetermined value to a first predetermined value when the operating mode is in a first mode; and
set the predetermined value to a second predetermined value when the operating mode is in a second mode.

18. The battery of claim 17 wherein the second predetermined value is greater than the first predetermined value.

19. The battery of claim 10 wherein the switch control module is configured to selectively vary the voltage applied to the gate of the one of the switches based on the current through the one of the switches and N other currents through N other ones of the switches, the N other ones of the switches configured to connect at least N other ones of the individually housed batteries in parallel with the one of the individually housed batteries to the one of the first and second terminals.

20. A battery, comprising:
a first terminal;
a second terminal;
a plurality of individually housed batteries;
a plurality of switches configured to connect ones of the individually housed batteries to and from ones of the first and second terminals; and
a switch control module configured to, based on a resistance of one of the switches, selectively vary a voltage applied to a gate of the one of the switches to voltage values that are between (i) a first predetermined voltage corresponding to one of the switches being fully open and (ii) a second predetermined voltage corresponding to the one of the switches being fully closed, the one of the switches configured to connect at least one of the individually housed batteries to one of the first and second terminals.

* * * * *